(12) United States Patent
Harris

(10) Patent No.: US 10,349,651 B2
(45) Date of Patent: Jul. 16, 2019

(54) CRAWLING INSECT BARRIER DEVICE AND CORRESPONDING METHOD

(76) Inventor: Charles E. C. Harris, Chiang Rai (TH)

( * ) Notice: Subject to any disclaimer, the term of this patent is extended or adjusted under 35 U.S.C. 154(b) by 915 days.

(21) Appl. No.: 12/107,680

(22) Filed: Apr. 22, 2008

(65) Prior Publication Data

US 2009/0025310 A1 Jan. 29, 2009

Related U.S. Application Data

(60) Provisional application No. 60/926,291, filed on Apr. 26, 2007, provisional application No. 60/949,749, filed on Jul. 13, 2007, provisional application No. 60/972,726, filed on Sep. 14, 2007.

(51) Int. Cl.
*A01M 29/34* (2011.01)
*A01M 29/30* (2011.01)

(52) U.S. Cl.
CPC ............ *A01M 29/34* (2013.01); *A01M 29/30* (2013.01)

(58) Field of Classification Search
CPC .............................. A01M 29/30; A01M 29/34
USPC ........................ 43/107, 121, 124, 132.1, 133
See application file for complete search history.

(56) References Cited

U.S. PATENT DOCUMENTS

| | | | | |
|---|---|---|---|---|
| 1,108,764 A | * | 8/1914 | Kull | 47/32.5 |
| 1,512,618 A | * | 10/1924 | McDonald | 47/32.5 |
| 1,619,493 A | * | 3/1927 | Marmignat | A41G 9/00 |
| | | | | 112/404 |
| 1,953,947 A | * | 4/1934 | Bernitz, Sr. | 47/32.5 |
| 2,139,225 A | * | 12/1938 | Easling | 43/107 |
| 2,746,201 A | * | 5/1956 | Warrell | 43/108 |
| 4,062,067 A | * | 12/1977 | Franzen | A42B 1/22 |
| | | | | 2/410 |
| 4,323,610 A | * | 4/1982 | Leverich | A47B 95/043 |
| | | | | 428/100 |

(Continued)

FOREIGN PATENT DOCUMENTS

| | | | |
|---|---|---|---|
| GB | 2067064 | * | 7/1981 |
| SU | 1076068 | * | 2/1984 |

OTHER PUBLICATIONS

English translation of SU Patent 1076068 to Romanenko, Feb. 28, 1984.*

(Continued)

*Primary Examiner* — David J Parsley
(74) *Attorney, Agent, or Firm* — Donald L. Bartels; Bartels Law Group

(57) ABSTRACT

A crawling insect barrier in which the combination of elements functions as a natural device to prevent ants or other crawling insects from accessing a table, cabinet, storage bin, structure, or any area wherein crawling insect infestation is undesirable. In one embodiment, a feather ring comprises a string (elastic or fixed length) to which natural feathers of various sizes and shapes are fastened, to thereby create a natural barrier or boundary that prevents crawling insects from crossing, and thus inhibiting the insects' ability to carry food, mark a path, build a nest, or infest an area. In another embodiment, a band or strap is used as the underlying surface on which the feathers are attached. If the string, band or strap is not elastic, the crawling insect barrier can be attached with adhesive or some other conventional fastener. The invention also includes a corresponding method of making the natural crawling barrier.

21 Claims, 36 Drawing Sheets

(56) References Cited

U.S. PATENT DOCUMENTS

| | | | | |
|---|---|---|---|---|
| 4,325,996 | A * | 4/1982 | Krietemeier | A41G 9/00 |
| | | | | 428/102 |
| 4,401,259 | A * | 8/1983 | Knutson | A45C 1/12 |
| | | | | 232/4 R |
| 4,471,562 | A | 9/1984 | Brucker | |
| 4,555,866 | A | 12/1985 | Stone | |
| 5,064,725 | A * | 11/1991 | Acker | B44C 5/02 |
| | | | | 428/16 |
| 5,287,648 | A * | 2/1994 | Hand et al. | 43/121 |
| 5,353,556 | A | 10/1994 | Hand et al. | |
| 5,437,935 | A * | 8/1995 | Fredeen | B44C 5/06 |
| | | | | 428/16 |
| 5,496,612 | A * | 3/1996 | Ransbottom | A43B 3/0078 |
| | | | | 2/245 |
| 6,210,251 | B1 * | 4/2001 | Primos | A01M 31/004 |
| | | | | 446/207 |
| 6,223,463 | B1 | 5/2001 | Carlson et al. | |
| 6,282,833 | B1 * | 9/2001 | Dashefsky | 43/132.1 |
| 6,775,943 | B2 * | 8/2004 | Loughman | A01M 31/06 |
| | | | | 43/2 |
| 6,776,123 | B2 * | 8/2004 | Homan | A01K 15/026 |
| | | | | 119/709 |
| 8,323,756 | B2 * | 12/2012 | Peterson | B44C 5/02 |
| | | | | 428/16 |

OTHER PUBLICATIONS

The Northern Maidu, by Roland Burrage Dixon, Published 1905, pp. 148-159.*

Craft and Decorative Feathers [online]. Lamplight Feather, Apr. 23, 2006. At: <URL: http:/web.archive.org/web/20060423214246/http://www.tonyhill.net/productCat85975.ctlg.

* cited by examiner

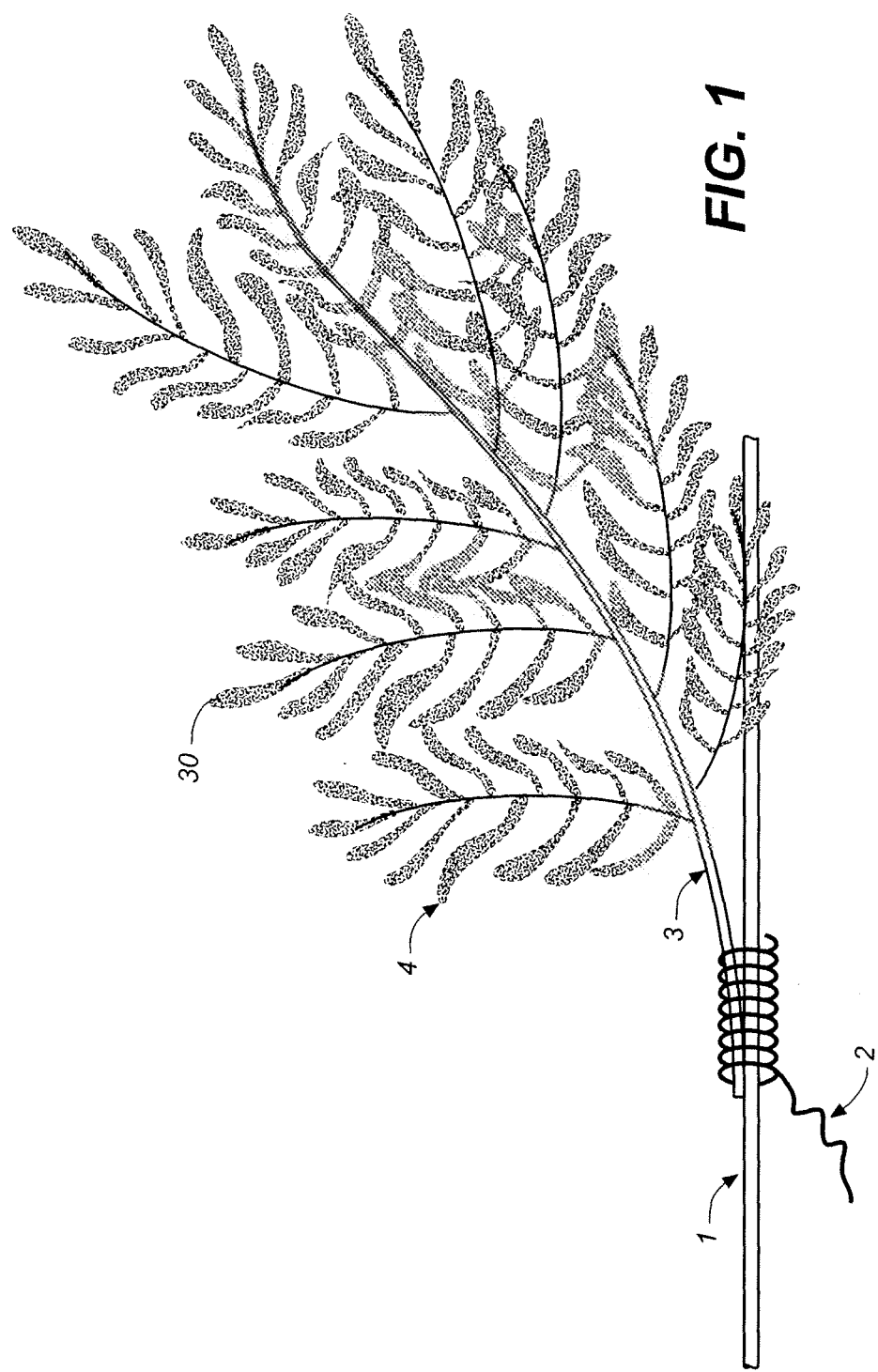

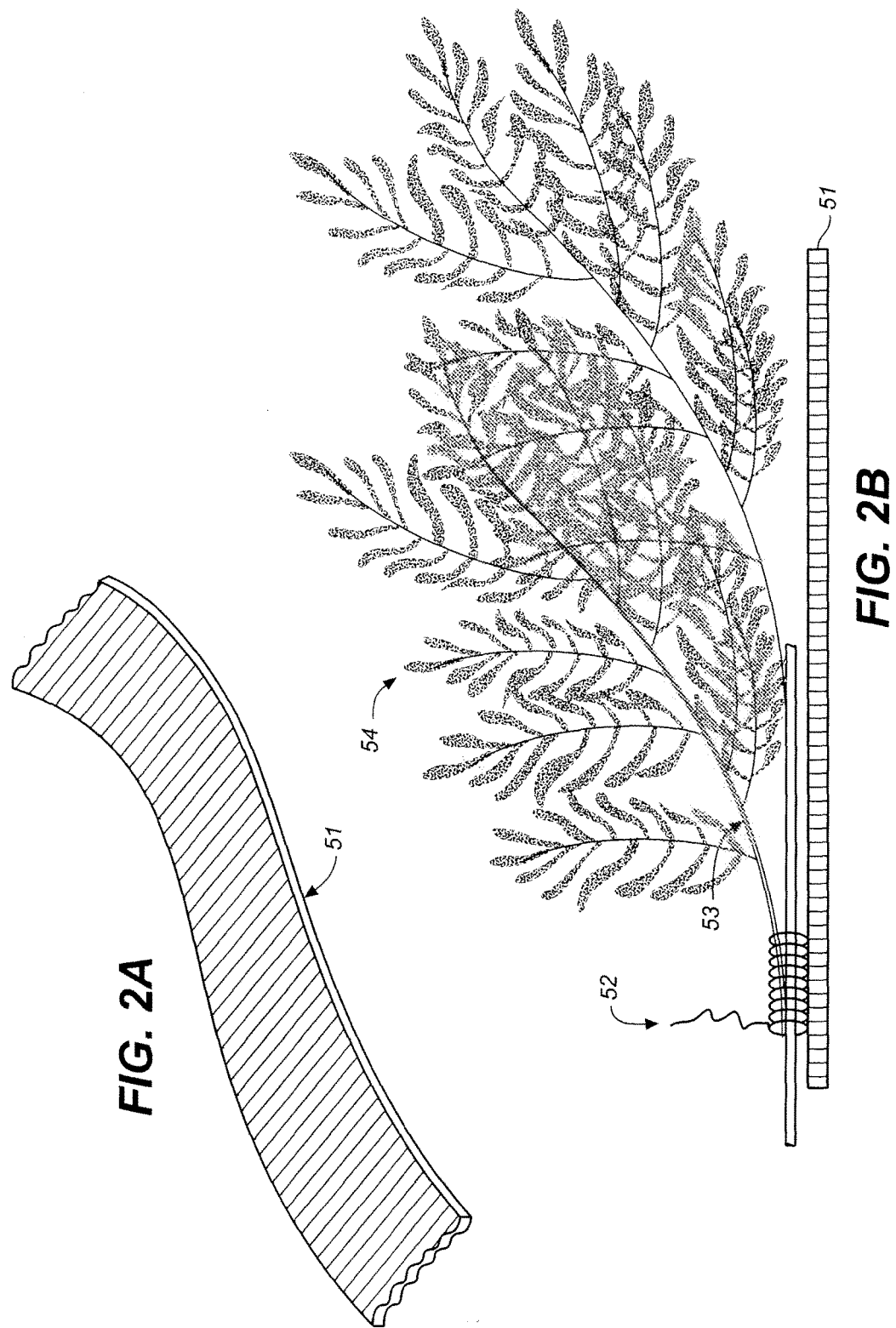

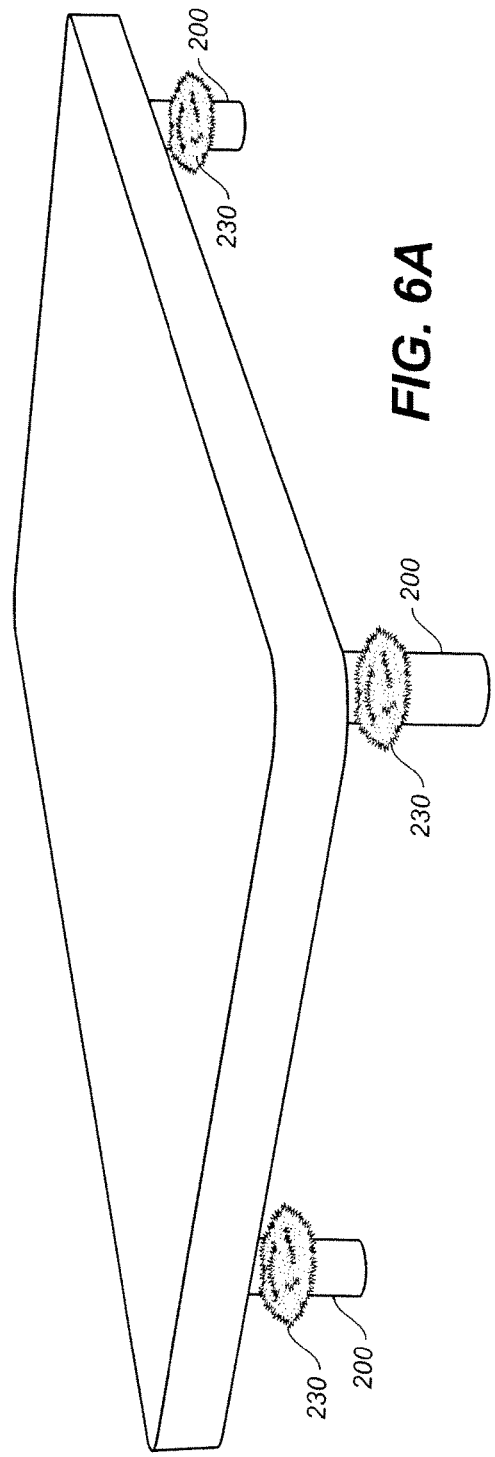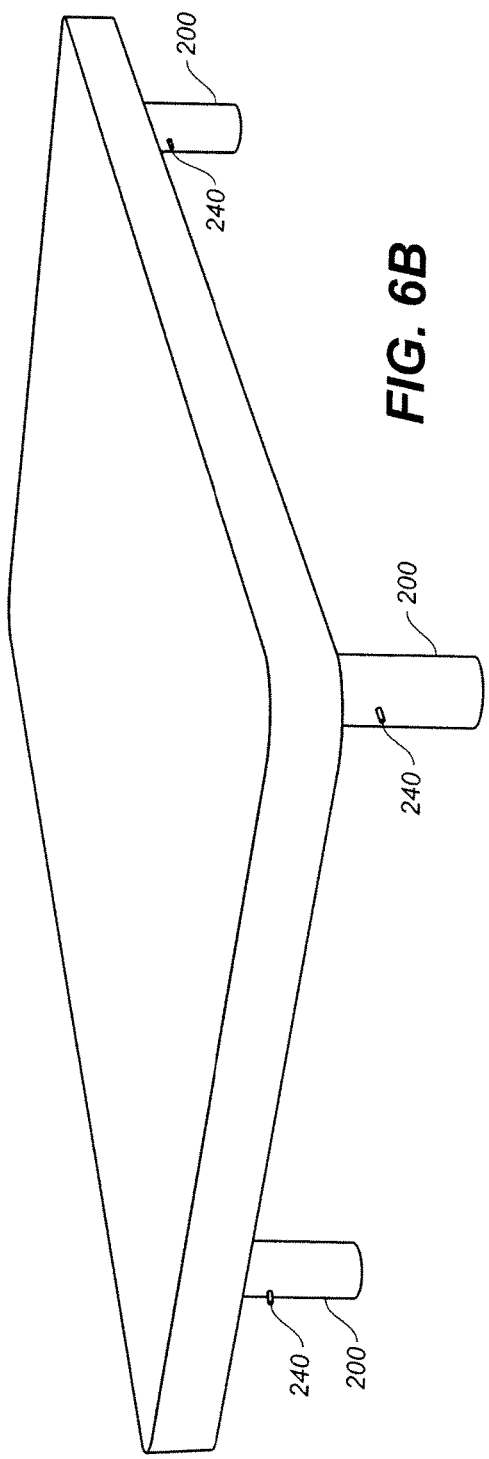

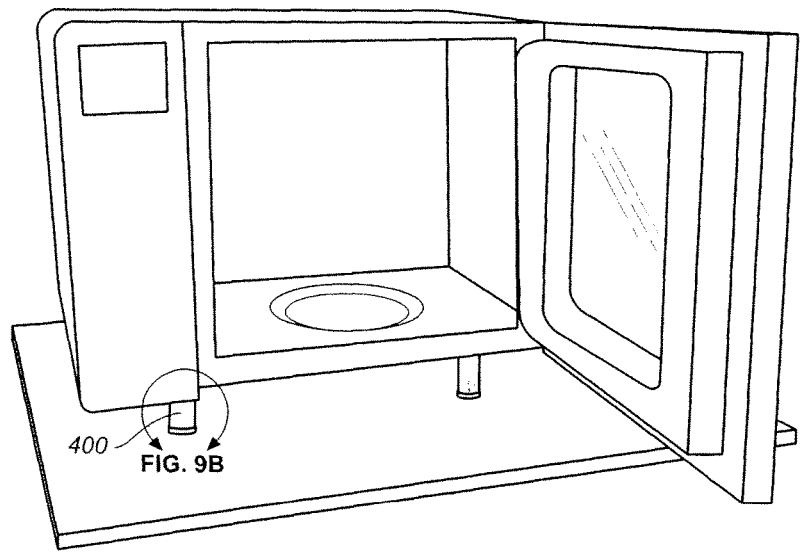
FIG. 9A
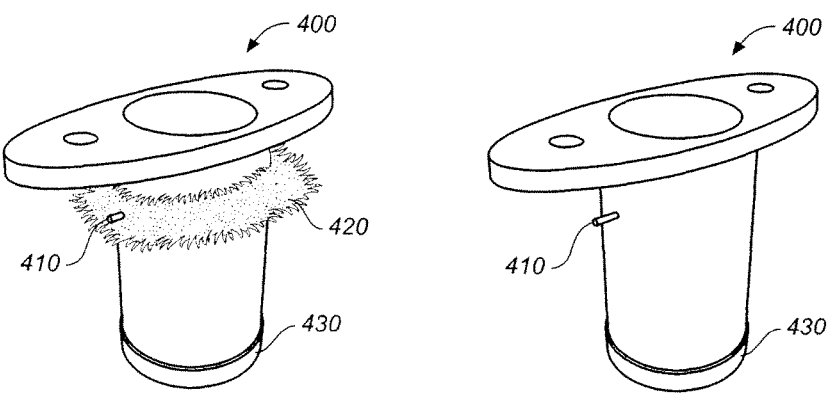
FIG. 9B  FIG. 9C

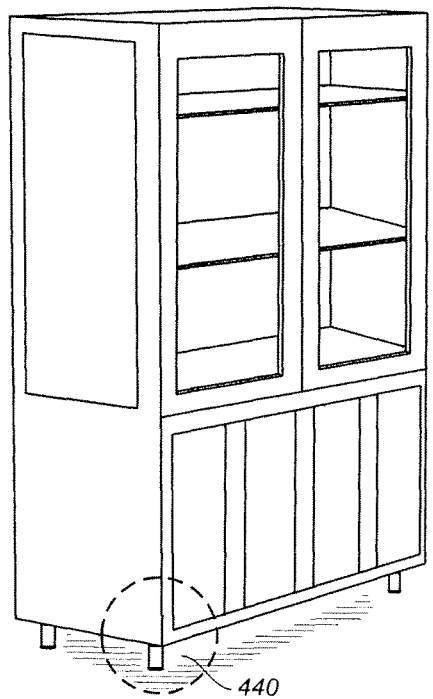
FIG. 10A
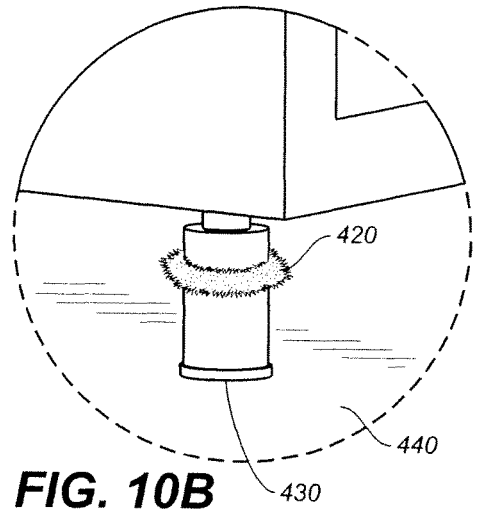
FIG. 10B
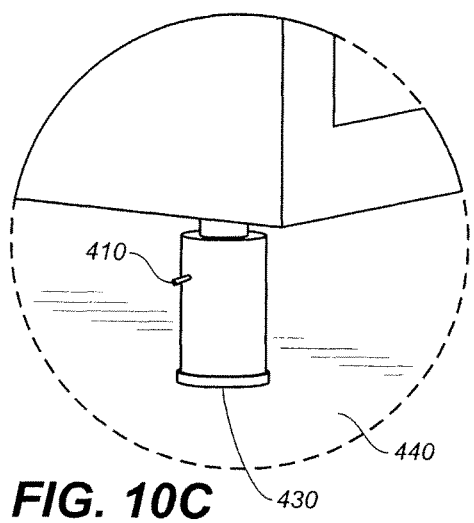
FIG. 10C
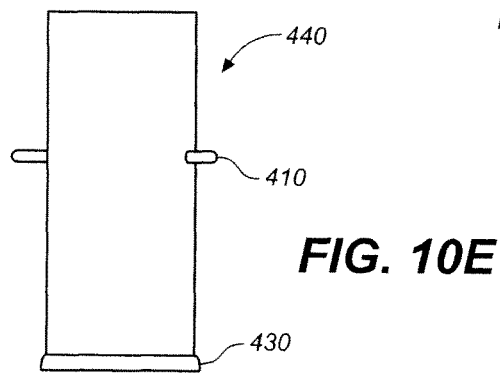
FIG. 10D
FIG. 10E

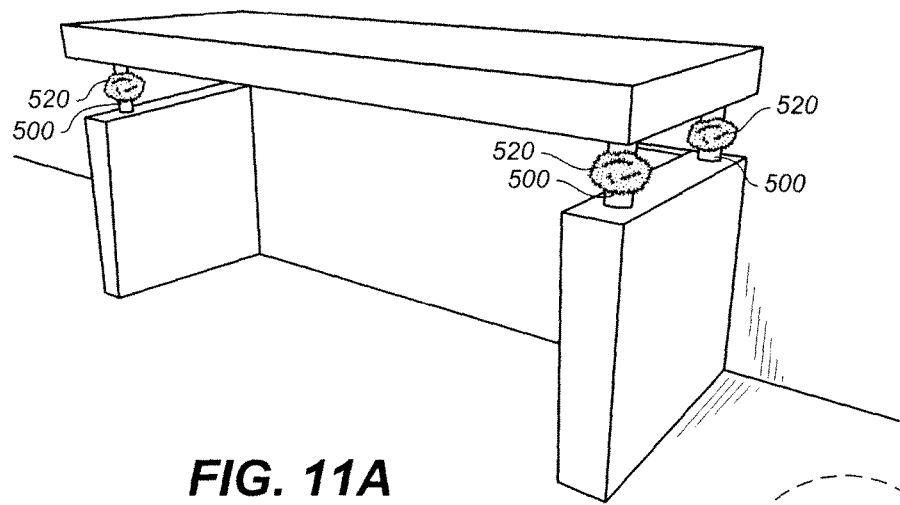
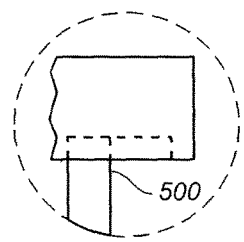
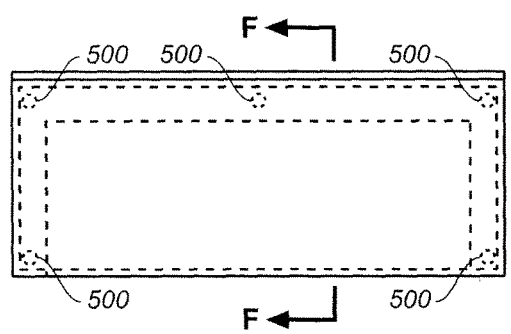
FIG. 11E
FIG. 11B
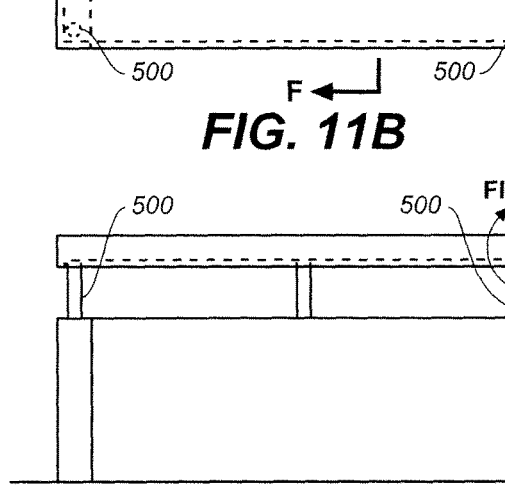
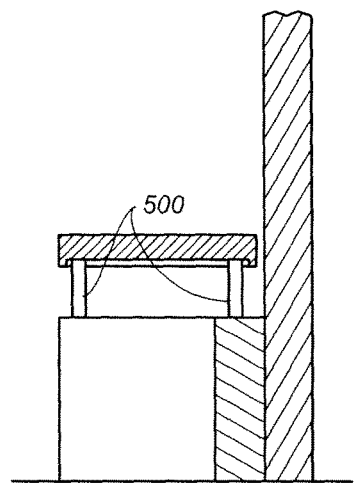
FIG. 11C
FIG. 11D

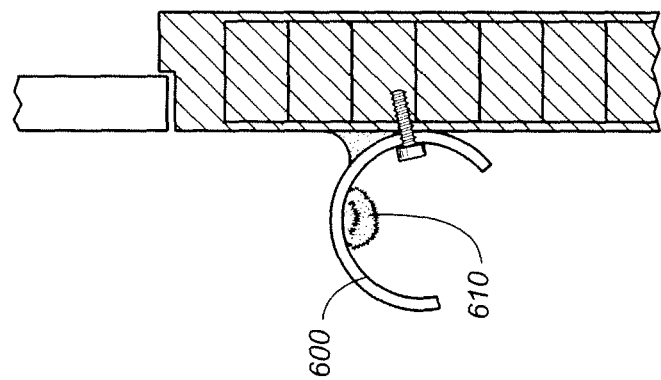
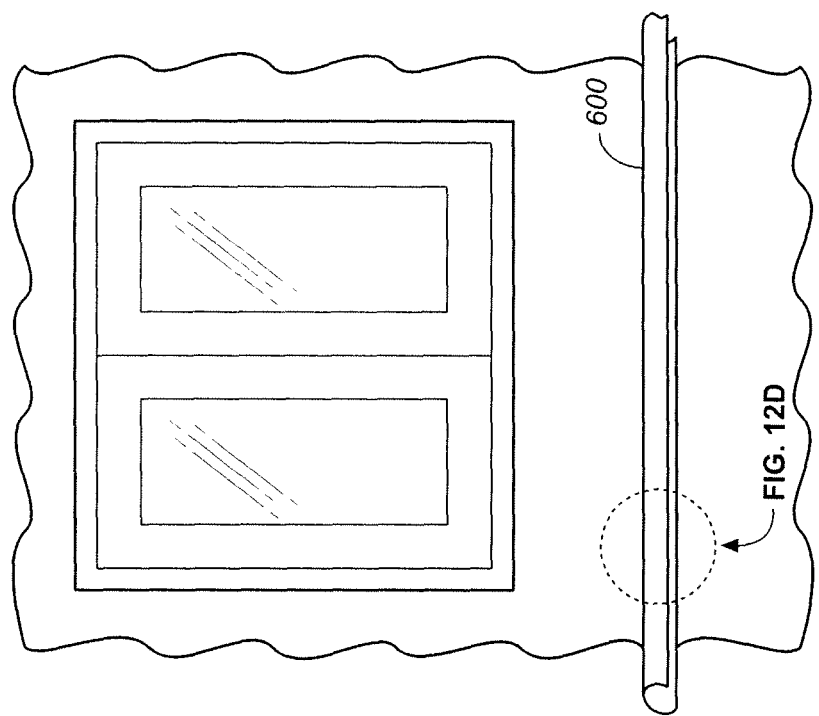
*FIG. 12D*
*FIG. 12C*

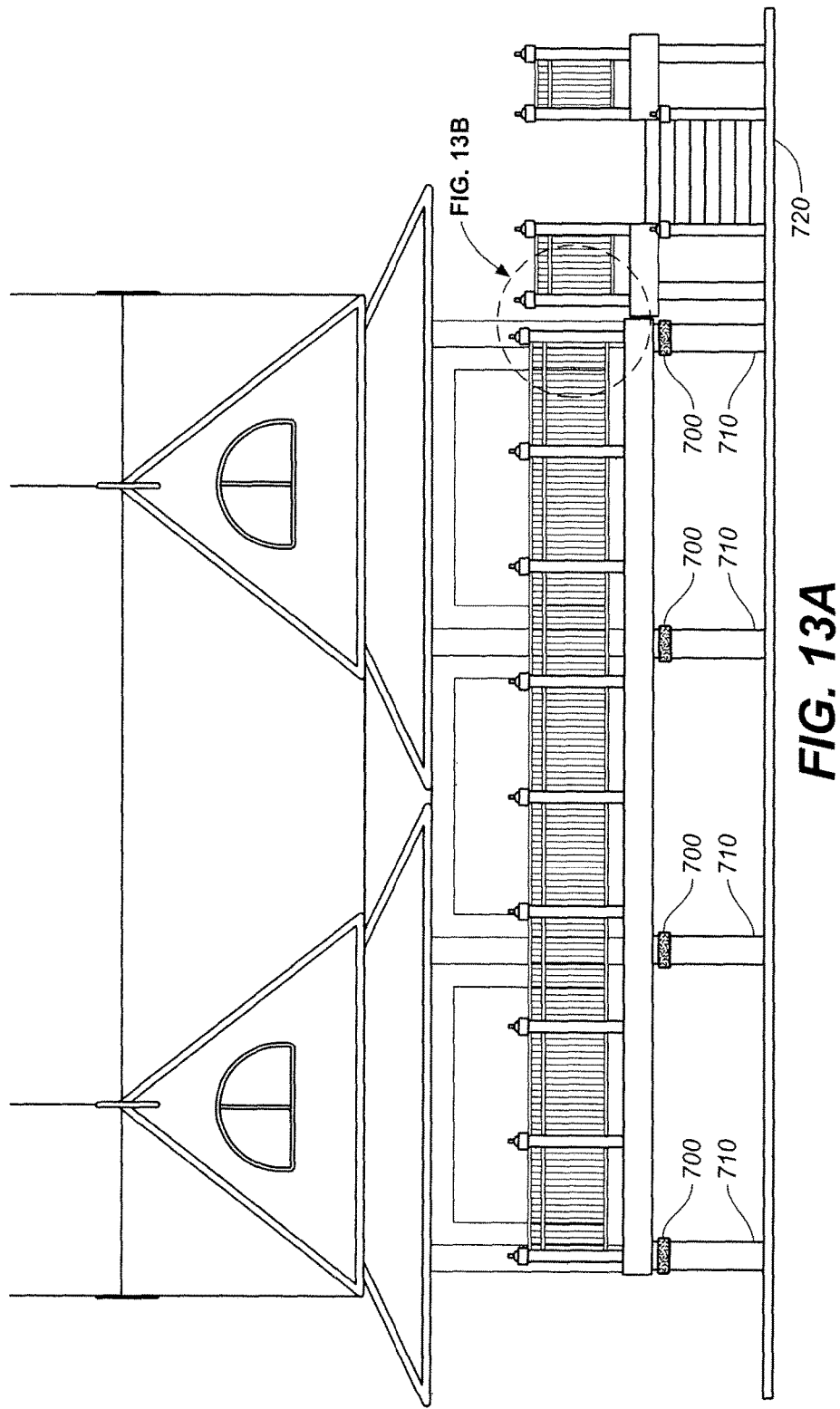

CRAWLING INSECT BARRIER DEVICE AND CORRESPONDING METHOD

This application claims the benefit of U.S. Provisional Patent Application Ser. No. 60/926,291, filed Apr. 26, 2007, U.S. Provisional Patent Application Ser. No. 60/949,749, filed Jul. 13, 2007, and U.S. Provisional Patent Application Ser. No. 60/972,726, filed Sep. 14, 2007, pursuant to 35 U.S.C. § 119(e). The previously named applications are hereby incorporated herein by reference, in their entireties and for all purposes.

FIELD OF INVENTION

This invention relates to devices and methods for creating a barrier to stop crawling insect infestations, in particular, ant infestations.

BACKGROUND OF THE INVENTION

Various techniques are known for stopping infestations of ants and other crawling insects, including chemicals that are sprayed from cans and chemical chalks, glues, foams, or substances that kill ants as they crawl and attempt to pass a barrier. During construction of homes, whole construction sites are injected with chemicals to kill all surrounding insects for years to come. The chemicals can leech into the water table and landscaping. Chemicals in some areas (such as a kitchen) may not be desirable and many chemicals may have to be applied frequently to be effective for pest control. Chemical sprays and chalks also disperse into the air and surrounding areas and can settle on food or sensitive items. Some ants may survive the barrier and carry the chemicals with them causing people to be exposed directly to dangerous agents. Other people object to killing all living things, including insects, on religious or moral grounds and therefore are adverse to using chemicals.

Other methods include having small cups filled with water or some other liquid that are placed under table legs. The water acts as a barrier like a moat and typically prevents access to the table, cabinet, or storage area above. However, these alternatives leave much to be desired. Water cups must be filled regularly (they empty relatively quickly due to evaporation) and they are cumbersome when one wants to move the table or cabinet or to clean the floor in the area of the cups.

In the prior art, certain boots are known to have a ring of fur around their tops and this fur may help protect the wearer from insects crawling up the boot, in addition to insulating the boot wearer from the cold. However, there is no known use of feathers for this purpose. Rings of feathers are known in the art, but they are typically used only for ornamentation, e.g. a feather boa used as a fashion accessory. More specifically, feather boas are typically used in novelty and other items such as key chains, hair clips, ladies' purses, collars, costumes, masks, fans, head dresses, bridal wear, flower crafts, dolls, carnival and Mardi Gras items, Halloween items, Christmas items, miniatures, dusters, cat toys, fly tying for fishing, and many other applications. The feathers used in feather boas can include ostrich feathers, to provide large fluffy boas, larger flat turkey feathers, for heavier large diameter boas, marabou feathers, the fine down from marabou to form thin fluffy boas, and chandelle, feathers or "flats" that are used to create lighter boas with smaller diameters. None of these prior art uses teach a feather structure according to the present invention.

Therefore, there is an unmet need for an inexpensive ant (or other crawling insect) barrier device that is chemical-free, easy to use, durable, effective, and appealing to the senses.

SUMMARY OF THE INVENTION

The method and apparatus according to the present invention comprises the creation of a barrier to prevent ants or other crawling insects from accessing or crossing into areas or places where they are not desired. These feather barriers also decrease the total number of ants at a given location. The inventor has observed that, if there are no food sources in a given room that ants have access to, there will be less total ants in the room. In other words, the present invention prevents "scout" ants from finding food which, in turn, prevents these "scout" ants from laying chemical trails that recruit additional worker ant nest-mates to the food source. Since each of those nest-mates would then lay their own chemical trails to the food source and recruit even more ants, preventing the "scout" ants from initially finding a food source would drastically reduce the total number of ants in a room.

The barriers are made of downy (i.e., resembling a bird's down) structures attached to a base. Preferably, these downy structures are natural feathers, such as turkey marabou, duck down, goose down or ostrich feathers that are soft and fluffy and have many filaments, but may also be made of other materials that function like feathers. The feathers are attached to bases that are preferably elastic strings or bands and then may be formed into rings. Alternatively, the feathers are fastened on one or both surfaces of elongated bands or straps that may also be elastic. These feathered bands or straps may then be attached to one another to form longer straps or bands. In addition, these longer straps or bands may be formed into rings. The feathers may be sewn onto the elastic strings, bands, or straps in a similar fashion as feathers are sewn onto a string or rope to make feather boas, or by any other method.

Unexpectedly, the barriers constructed and used according to the present invention, especially when certain types of feathers (i.e., downy feathers) are used, are very effective in stopping crawling insects, especially ants, from accessing a predetermined area (e.g., a tabletop, tray, food items, etc), without the need to use chemicals. These feather strings, bands and straps are very inexpensive and easy to use and apply, and the materials needed to construct them are readily available all over the world.

The elements of one embodiment of this method comprises using various bird feathers such as turkey marabou formed into a fixed or elastic ring of different diameters. The feathers are sewn onto a string, band, or strap and tightly packed preferably using a needle and thread. The ring may be an elastic string or the like, so that the ring can be stretched to snugly fit around various shapes. In the case of a table leg, for example, the ring is preferably elastic and stretches so as to be positioned securely on the leg, i.e., with elastic tension of the ring enabling the ring to fit snugly and not fall or leave any space between the ring and the leg.

In the case of a window or other opening in a wall or other surface, an elongated band or strap of material having a flat surface on one side and feathers sewn into the other side may more preferably be used. It can be glued, taped, epoxied, sewn, nailed, screwed, stapled, tacked, or otherwise fastened in a conventional manner to a surface, with the type of fastener to be used typically depending upon the makeup of the surface to which the band or strap will be attached. For example, the side of the band or strap that is opposite to the feathers may have a conventional adhesive coating with a removable non-adhesive tape that is removed when the band or strap is installed. The downy crawling insect barrier according to the invention can also be shaped to fit a square opening, a rectangular opening, or any other shaped opening. In addition, the barrier according to the present invention need not completely surround the opening or area to be protected. It may be of utility to provide a barrier that directs the insects to an area that the insects do not want to pass, e.g. to the edge of a body of water, such as a pool.

The present invention further includes structures to protect the feather rings, bands, or straps from moisture, since feathers lose their effectiveness as a crawling insect barrier is allowed to get wet. For example, if used outdoors, the structure will protect the barrier from rain. The structure may be an umbrella, cone, or awning-like structure positioned in a conventional manner above the feather string, band, or strap. The downy barrier may be attached directly to the protective structure. For example, the downy barrier may be fastened to the underside of the cone-shaped structure. Alternatively, the feather string, band, or strap may also be fastened inside of an inverted gutter or tube section to protect the feathers from getting wet. The gutter can be fastened to any outdoor surface in a conventional fashion.

BRIEF DESCRIPTION OF THE DRAWINGS

FIG. 1 shows a schematic view of attaching downy feather filaments to an elastic material according to one embodiment of the crawling insect barrier of the present invention.

FIGS. 2A-2G show elements of an embodiment wherein exemplary feathers are sewn into elastic or non-elastic strips of material.

FIG. 6A shows an embodiment of an crawling insect barrier of the present invention, wherein a feather ring is attached to each leg of an exemplary table tray. FIG. 6B shows the exemplary table tray with the crawling insect barriers removed, showing the pins on the tray legs.

FIG. 9A shows an embodiment of the crawling insect barrier of the present invention, wherein a feather ring is connected to each exemplary leg attachment, the leg attachments elevating a microwave oven. FIG. 9B shows an enlarged view of one of the exemplary leg attachments with the crawling insect barrier attached. FIG. 9C shows the exemplary leg attachment with the crawling insect barrier removed, showing the pin on the leg attachment.

FIG. 10A shows an embodiment of the crawling insect barrier of the present invention, wherein a feather ring is connected to each exemplary leg attachment. FIG. 10B shows an enlarged view of one of the exemplary leg attachments with crawling insect barrier attached. FIG. 10C shows one of the exemplary leg attachments with the crawling insect barrier removed, showing the pin on the leg attachment. FIG. 10D illustrates a top schematic view of the exemplary leg attachment. FIG. 10E illustrates a side schematic view of the exemplary leg attachment.

FIG. 11A shows an embodiment of the crawling insect barrier of the present invention, wherein a feather ring is attached to each column of an exemplary elevated counter. FIG 11B illustrates the top schematic view of the exemplary elevated counter. FIG. 11C illustrates a side schematic view of the exemplary elevated counter. FIG. 11D illustrates a cross-sectional schematic view along line F of the elevated counter. FIG. 11E illustrates an enlarged cross-sectional schematic view of the edge of the exemplary elevated counter's countertop.

FIG. 12C illustrates a schematic view of the tube-shaped crawling insect barrier attached to a structure, such as the outside of a house. FIG. 12D illustrates a cross-sectional schematic view of an embodiment of an crawling insect barrier fastened to a surface to protect the feathers from rain or other moisture.

FIG. 13A shows an embodiment of the crawling insect barrier of the present invention, wherein a feather ring is attached to each of the support structures of an exemplary large structure (e.g., a house).

FIG. 14A shows a feather ring attached to each of the support legs of an exemplary bed. FIG. 14B shows a feather ring attached to each of the support legs of an exemplary crib.

FIG. 18A shows an exploded top perspective view of the bowl and bowl support. FIG. 18B shows a perspective top view of the bowl inserted into the support. FIG. 18C shows an underside view of the bowl support. FIG. 18D shows another underside view of the bowl support with a feather barrier ring installed. FIG. 18E illustrates a cross-sectional schematic view along line D of the bowl support. FIG. 18F illustrates a bottom schematic view of the bowl support. FIG. 18G illustrates a side schematic view of the bowl support. FIG. 18H illustrates a cross-sectional schematic view along line D of the bowl support and bowl with the bowl inserted therein. FIG. 18I illustrates a top schematic view of the bowl. FIG. 18J illustrates a side schematic view of the bowl and support. FIG. 18K illustrates an enlarged cross-sectional schematic view of the edge (upside-down channel) of the bowl support. FIG. 18L illustrates an enlarged cross-sectional schematic view of the bowl support with the bowl inserted therein. FIG. 18L also illustrates an embodiment of a structure for assisting with removal of the insert bowl. FIG. 18M illustrates an enlarged cross-sectional schematic second view of the bowl support with the bowl inserted therein.

FIG. 20A illustrates a side view of the cone-shaped moisture barrier. FIG. 20B illustrates a cross-sectional view of the cone-shaped moisture barrier, with the downy-bases attached to its underside.

FIG. 21A illustrates a cross-sectional view of the embodiment with the downy-bases attached to one side of the disk-shaped backing. FIG. 21B illustrates a cross-sectional view of the embodiment with the downy-bases attached to both sides of the disk-shaped backing. FIG. 21C illustrates a bottom view of the embodiment, with the downy bases attached to the disk-shaped backing.

FIG. 22A shows a perspective view of the leg of a table with the spokes installed. FIG. 22B shows a side view of the same leg with the downy-bases mounted on the spokes.

Figure 2C:
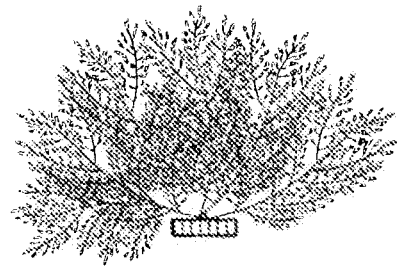

Measurements used in the figures are for exemplary purposes only and do not limit the invention in any way.

DETAILED DESCRIPTION OF THE INVENTION

The crawling insect barriers according to the present invention comprise a combination of elements that creates a natural physical barrier to ants and other crawling insects. The structures preferably used in the barriers according to the present invention are similar to down feathers (i.e., downy). The downy structures are feathery, lightweight, durable, fluffy, soft and have many tiny, flimsy filaments, with many offshoots. The filaments are difficult for some larger ants and other crawling insects to grasp, while smaller ants and insects merely get lost, or are unable to lay a chemical trail. The downy structures have sizes ranging from between 2 cm and 12 cm (averaging about 10 cm). The downy structure are attached, preferably sewn with a needle and thread, onto a base (e.g., an elastic or other string or rope, or onto a surface of an elongated band or strap). The downy structures are preferably tightly packed in order to form a more impenetrable barrier to crawling insects. In other words, the number of downy structures attached to the base creates a barrier that is sufficiently full and fluffy to prevent the existence of any gaps large enough to allow a crawling insect of a predetermined size to pass through.

Preferably, the barriers are formed using turkey marabou feathers (or other man-made material that look, feel, and function like feathers or filaments), formed into a fixed or elastic ring of different diameters.

Animal feathers are of different types, depending on their function. They include feathers with vanes for contour and flight feathers, down feathers, filoplume feathers, semiplume feathers and bristle feathers. Feathers are composed of many sections, such as the rachis, which refers to the long tubular portion of the feather above the animal's skin. This tube is commonly called the shaft when referring to both the portion under the skin (calamus) and above (rachis). Attached to the rachis is the vane extending to either side of the rachis. The vane is composed of slender filaments called barbs and even finer filaments called barbules with hooklets. Down feathers are preferred for the crawling insect barriers according to the present invention. Down feathers are small, soft, and fluffy because they have many non-interlocking barbs, but they lack the barbules and their accompanying hooklets seen in contour and flight feathers.

The down feathers or the like according to the present invention create a formidable barrier to ants and other crawling insects. The characteristics of these feathers that make them an effective barrier are their fluffiness, softness, thickness, and spaciousness, and yet they are of sufficient durability and solidity to force an ant or other crawling insect to climb individual filaments of the down feathers (as if it were climbing to the top of a tree, but unable to reach the next tree top).

The applicant, observing numerous ants, found that these down feathers acted like a maze, a jungle, or a forest, which typically forces the ant to crawl up and away from the rachis up the non-interlocking barbs, which finally lead to a dead end. The ant seems to have problems laying chemical markers to make a path going around the feathers. If one ant is lucky to get to the other side of the feather barrier, the trip back is just as troublesome and prevents the long lines of ants from forming that one normally sees where no barrier presents itself. As a result, the ants lose their sense of direction and are unable to pass the barrier.

A listing of the types of feathers that will work as a crawling insect barrier include various types of down, such as turkey marabou, goose down, duck down, ostrich, etc. Man-made materials that function and look similar to down feathers may alternatively be used in the barrier of the present invention. Such man-made materials include, but are not limited to, acrylic and/or polyester fibers which are woven into a backing normally made from nylon, cotton, or polyester, or carbon and metal fibers or filaments sewn or fixed to straps of different materials, including carbon or metal straps. Downy structures produced by new and emerging technologies may also be used in the crawling insect barrier of the present invention. For example, nano-technologies to produce downy structures may be used in the barrier of the present invention.

Turkey marabou feathers are preferably used according to the present invention because they are fine down feathers that are readily available.

The feathers according to the present invention can be sewn or otherwise fastened to various bases, to form downy-bases. The structures for the bases may include: (1) a string or rope having a substantially circular cross-section, and being either elastic or not, wherein the feathers are fastened all around the string or rope as the size allows; or (2) a band or strap having a substantially rectangular cross-section, and being either elastic or not, wherein the feathers are fastened on one or both sides of the band or strap, depending on the width of the band, the application, surface to which the band or strap is applied, and whether or not one side is self-adhesive. For bands or straps wherein the feathers are attached on both sides, the feathers are preferably attached around the entire structure, with feathers extending out all around (i.e., 360 degrees).

Especially for smaller bands or straps, it is preferred to have feathers on both sides and all around the band in order to ensure that the feathers provide full coverage along the surface to which the band or strap is fastened. For smaller bands or straps, fastening feathers on all surfaces makes it easier to obtain full plumage from the feathers than if they are fastened on just one side of the band or strap, since there is, by definition, more surface area to use in fastening the feathers to the band or strap. With the feathers on both sides, the feathers on the side facing the surface of the structure on which the band or strap is attached are compressed to some extent causing them to jut outwards on each side of the band or strap to thereby enhance the crawling insect barrier's effectiveness. Having the feathers on all sides also facilitates the filling in of rough surfaces and grooves on the surface to which the band or strap will be applied. The elastic bands typically have a width of about one fourth of an inch, and the straps typically have a width of about one half of an inch or more. The straps are preferably made of cotton or nylon, and can be manufactured in any length desired, e.g., 1, 10, or 20 feet long. The more feathers sewn or fastened to these structures and the greater the width of the band or strap, the more effective the barrier.

The feather barrier should be placed in such a way that the ant or crawling insect is forced to traverse the maximum distance possible across the feather barrier. Also, the distance from the tip of the outermost feather filament to an additional surface should be sufficiently large to prevent the crawling insect from reaching that surface. Preferably, this distance is about one inch. This is particularly true for feather barriers placed under umbrella-, cone-, awning- or tube-like structures.

When placed in the path of a crawling insect (e.g., an ant), the feather barriers prevent the insect from traveling along the path to some predefined area. In general, the predefined area includes any area where the crawling insect is unwanted. Examples of these types of areas include a tabletop, plate, bowl, turntable, tray, appliance, countertop, furniture, bed, crib, building interior, tablecloth top, electronic device, saucer, pet food bowl, vehicle, etc. The path to the predefined area may include any entry location the insect uses to access the predefined area. These entry paths include, for example, legs, stilts, wheels, support structures, bases, window, walls, doors, frames, roofs, trees, etc.

Any means for mounting or attaching the crawling insect barriers to a surface may be used. For example, the barriers may be permanently attached to a surface by tape, glue, epoxy, adherent, needle and thread (sewn on), screws, nails, staples, tacks, wire or string, etc. The barriers may also be non-permanently attached to a surface, so that they may be removed and remounted. Examples of methods to non-permanently attach the barriers to a surface include elastic tension, various non-permanent adherents, VELCRO®, hooks, string, wire, etc. The barriers may also be held in place by physical means. For example, the barriers may be held in place by a ridge, bar, spoke, protrusion, pin, disk, groove, wire, string, etc. The barrier may also be mounted or attached using any combination of the above methods. For example, the downy-base may be glued onto a backing, with the backing then held in the path of the crawling insect by elastic tension.

In one embodiment, grooves are placed on the path of the crawling insect (e.g., a table leg) and in the same plane as the downy-base, such that the grooves hold the downy-base in place. The downy structures (feathers) may be attached to either an elastic or non-elastic base.

In another embodiment, the downy structures (feathers) are attached to an elastic base and formed into a ring. The resultant elastic downy-base is then placed in the path (e.g., a table leg) of a crawling insect. The downy-base is held in place by the elasticity of the base.

In yet another embodiment, the downy structures (feathers) are attached to an elastic base and formed into a ring. Grooves are placed on the path of the crawling insect (e.g., a table leg) and in the same place as the downy-base. The downy-bases are placed on the path such that the are held in place by both elastic tension and the grooves.

Another method for mounting the crawling insect barrier of the present invention includes attaching a two or more spokes to a surface and then weaving the downy-base through the spokes, so that the downy-bases block the path of a crawling insect. In one embodiment, the spokes are attached to table leg, such that they extend parallel the ground. A long string of the downy-bases may then be woven through the spokes and around the table leg. This creates a larger surface of feathers a crawling insect must cross, in order to reach the items on the table top. Alternatively, concentric rings of downy-bases may be woven onto the spokes, for a similar effect as created when weaving the one long string.

Similarly, to expand the area of feathers a crawling insect must cross to access an area, rings of the downy-bases may be attached to a disk-shaped backing in any pattern (for example, in concentric rings or overlapping rings). Preferably, the rings are placed closely together, such that a "field" of feathers is created for the insect to traverse. Alternatively, however, the rings may be spaced at various intervals, such the crawling insect crosses each ring separately. In another embodiment, a single string of downy-bases may be attached to the disk in such a manner that the crawling insect must cross the downy feathers, at least once. The disk with the feathered rings may then be attached, preferably with the feathers facing down, on a suitable structure (a table leg, for example). Thus, a crawling insect on the ground must traverse the feather barrier upside-down, in order to access the area above the disk. In many instances, the crawling insects are unable to maintain their hold on the downy filaments of the feathers and merely fall to the floor.

In another embodiment, instead of the disk-shaped backing, above, the downy-bases are attached to the underside of a cone-shaped backing. This configuration has the added benefit of protecting the downy-bases from moisture falling from above (i.e., rain or spills).

The crawling insect barriers of the present invention are not limited to the use of a single downy-base to block the path of the crawling insects. Multiple downy-bases may be placed in the path of a crawling insect to increase the effectiveness of the barrier. For example, multiple rings of downy-bases may be attached to a table leg, so that a crawling insect needs to cross each downy-base separately. Alternatively, the rings may be placed adjacent to each other to create a field of feathers for the crawling insect to cross. Any combination of methods to place the downy-bases in the path of the crawling insects may be used, in accordance with this invention.

The feather barriers of the present invention may be made by any means. Any naturally occurring or artificially produced down-like substance may be used to prevent crawling insects from accessing a predefined area. If necessary, these down-like substances may be attached to a base by any means necessary to produce the feathered barriers of the present invention. Examples of methods for attaching down-like substances to bases include, but are not limited to, glue and needle and thread (sewing). In one embodiment of the present invention, natural down feathers are sewn onto an elastic string. In another embodiment, natural down feathers are glued onto an elastic string.

Additionally, any combination of these methods may be used to create the crawling insect barrier. For example, the down-like substances may be sewn onto a base and that combination, itself, being glued onto a second support structure (e.g., a strap). One embodiment of this combination includes, for example, natural down feathers being attached (sewn or glued) to a string base; the feathered (downy) base then being attached to an elastic band. The attachment of the feathered (downy) base to the elastic band may be made in a way to preserve the elasticity of the band. For example, the feathered base may be attached to the elastic band only at certain intervals, such that the band is still able to stretch, but the effectiveness of the barrier is not affected.

These various structures are described in greater detail below.

FIG. 1 shows a schematic view of an exemplary ant barrier 30 incorporating the feathers with elastic material according to one embodiment of the present invention. The ant barrier 30 includes an elastic band 1, thread 2, a shaft 3, and down, i.e., downy feather filaments 4. The feathers are sewn preferably using a needle and thread 2. A reference to "x 1000" is included in FIG. 1 to indicate that the number of feather filaments in the ant barrier is preferably in the thousands. In practice, the number of feather filaments needed depends on the application. The number of feather filaments may be a function of simply how many feathers that can be attached on the elastic band 1, preferably starting at one end of the elastic band 1 with just one feather shaft 3, adding and sewing more shafts 3 until there are enough down filaments 4 to completely cover up the elastic band 1 and the shafts 3.

Figure 2F:
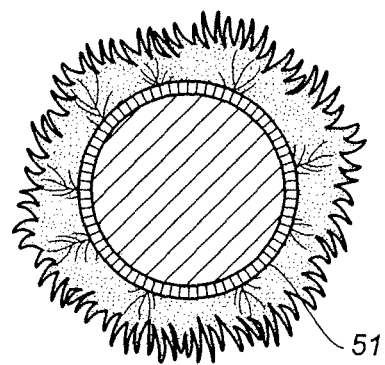
Figure 2D:
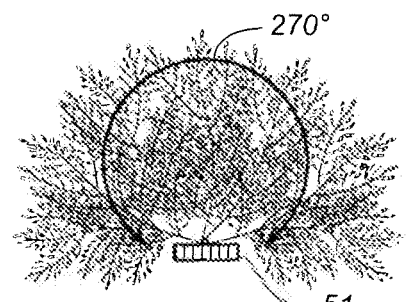
Figure 2E:
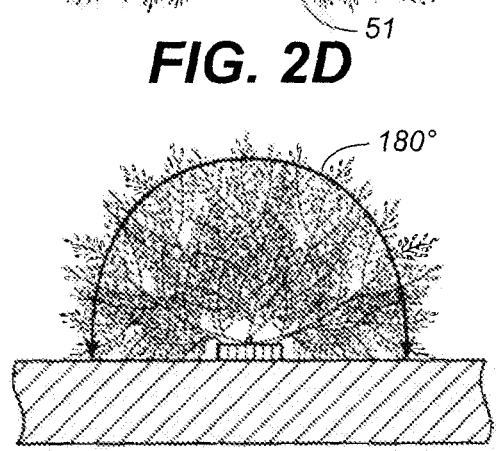
Figure 2G:
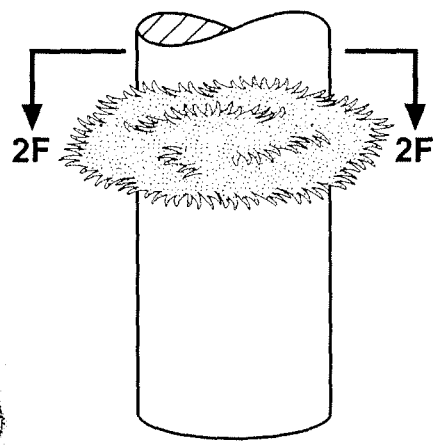

The top view of an exemplary one inch wide strap 51 is shown in FIG. 2A. FIGS. 2B and 2C show feather shafts 53 and feather down filaments 54 sewn via thread 52 on the surface of strap 51. FIGS. 2A-2G show embodiments of the ant barrier where the feathers extend outwards different amounts. As seen in FIGS. 2F and 2G, the feathers may extend out a full 360 degrees in a cross-sectional view when the ant barrier is fixed onto a table leg or the like. The feathers may also extend out in about a 270 degree arc, as seen in FIG. 2D, if the surface on which it is attached is a corner, or to about a 180 degree arc, as seen in FIG. 2E, when fixed to a flat surface. FIG. 2E illustrates the strap 51 affixed to a flat surface such that only 180 degrees of feathers need to be used, relative to the inside of strap 51. The embodiment of the present invention having the feathers extended outwards only about 180 degrees or 270 degrees reduces costs and/or enables the creation of a thicker feather barrier on the front side of the strap.

A key feature of the present invention is that, in order to provide an effective crawling insect barrier, there should not be any gaps between the string, band, or strap and the surface, e.g., the leg or the flat surface of a window sill.

According to one embodiment, the crawling insect barrier includes an elastic strap onto which the feathers are sewn all around it, i.e., on all sides. The feathers on the inside of the ring are pushed out to the side or smashed against the table leg or other surface to seal any gap between the strap and the leg. For a flat surface, a reduced number of feathers on the inside of the strap makes it easier to affix the strap to a surface, whether it be table leg, window edge, or wall.

Crawling insect barriers with feathers sewn onto an elastic strap, band, string or rope are preferred for use when surrounding an object such as a support or leg. Examples of supports or legs include a table leg, stand leg, tray support, dog food bowl, plate, bowl, crib leg, house support beam, etc. The invention is not limited to the use of elastic straps, bands, strings or ropes, however. For example, feathers may be sewn onto a non-elastic strap, band, string or rope, and placed to surround an object.

Crawling insect barriers with feathers sewn onto either an elastic or a non-elastic strap, string, band or rope can be used on flat surfaces, such as, for example, a tablecloth, window edge, etc. Non-elastic backing for the feathers is also preferred when the crawling insect barrier is used in an inverted gutter or inverted tube as shown in FIG. 5 and FIGS. 12A-D, respectively.

Thread is preferably used to connect two ends of a downy-base to make a ring-shaped barrier. For some table legs, however, the bottom end is very large or braced by a beam. The table may also be too heavy to lift. Other structures, such as the beams supporting a house, can not be lifted at all. A problem for these table legs and other structures is that, in order to fasten a feather ring to them, a customer may need to make the feather ring on the spot using ring sections, with a loop and hook, a snap, a tie wrap or some other conventional fastener to fasten the sections together. In order to address this problem, an embodiment of the crawling insect barrier of the present invention includes a self-adhesive strap that could be cut so as to form a continuous joined ring. A longer feather loop can similarly be constructed by connecting several shorter feather strings, bands, or straps together in a chain with the two ends of the chain fastened together in a conventional manner, as described above. Alternatively, a longer feather strap or band, which may be constructed with several smaller straps or bands, may be wrapped multiple times around a leg or support. These multiple loops may be in the shape of a corkscrew, with the loose ends of the band or strap connected to each other or to another portion of the band or strap, so that there is no path for an ant to travel without crossing the feather barrier at least once.

Crawling insect barriers with straps made with a self-adhesive backing may be used in other applications, such as with fabrics like boat covers and outdoor tents. Alternatively, the straps can be sewn on these fabrics. Also, crawling insect barriers according to the present invention may be used to wrap, bundle, or tie cables and wires that otherwise serve as "walkways" for ants to get into electronics or appliances. In a similar fashion, crawling insect barriers according to the present invention may be used in agricultural applications, such as use as a barrier for preventing ants from climbing up trees or posts (e.g., posts supporting grape vines), so as to prevent access to fruits or other crops. If the surface of the post or tree is uneven or contains grooves or the like, a feather strap according to the present invention may include feathers on both sides of the ring, or the uneven or grooved areas can be filled with foam, felt, or any other material that would seal these gaps and eliminate undesirable insect paths. In certain agricultural applications, it may also be better to use an elastic feather ring rather than a ring held by adhesive, or vice versa, to reduce the chance of the ring damaging the plant.

Other applications for the crawling insect barrier of the present invention include use as barriers for other crawling insects beside ants, including spiders, cockroaches, etc. Alternatively, the feather straps could be treated with natural additives such as cinnamon, garlic, lemon, eucalyptus, geranium, catnip, peppermint, baby powder, cayenne pepper, vinegar, tea tree oil, grapefruit seed extract, etc. to further increase their effectiveness against ants and other insects. Unlike the feathered straps, however, these additives would be temporary and stop giving off an aroma after a while.

Figure 3:
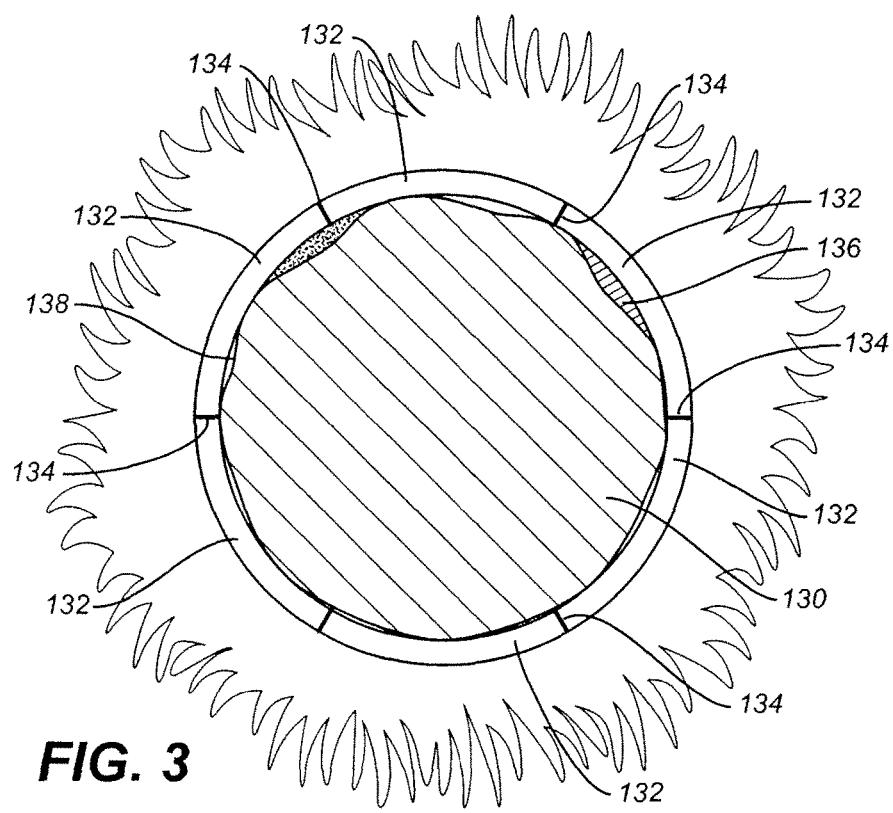
FIG. 3 is an embodiment of a crawling insect barrier formed from several lengths of straps connected together by conventional fasteners for fastening the barrier to, for example, a trunk of a tree to protect the fruit in the tree from crawling insect infestation.

FIG. 3 is an embodiment of a larger crawling insect barrier formed from several lengths of straps connected together by conventional fasteners for fastening the barrier to a structure, e.g., the trunk of a tree 130, to protect the fruit in the tree from crawling insect infestation. Each strap 132 is connected to the tree trunk 130 according to the user's preference. The straps 132 are fastened together at ends 134 by conventional fasteners, as exemplified above. Gaps in the tree trunk 130 can be filled in by feathers sown on the underside surface of a strap, as shown at 136, or using foam, felt, or some other conventional filler material, as shown at 138.

Figure 4A:
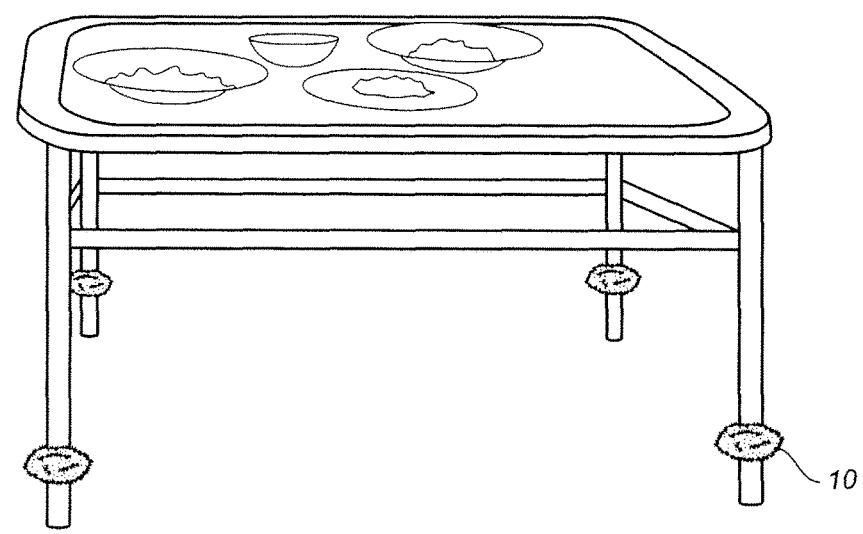
FIG. 4A shows a view of the feather ring positioned on a table leg according to an embodiment of the crawling insect barrier of the present invention.
Figure 4B:
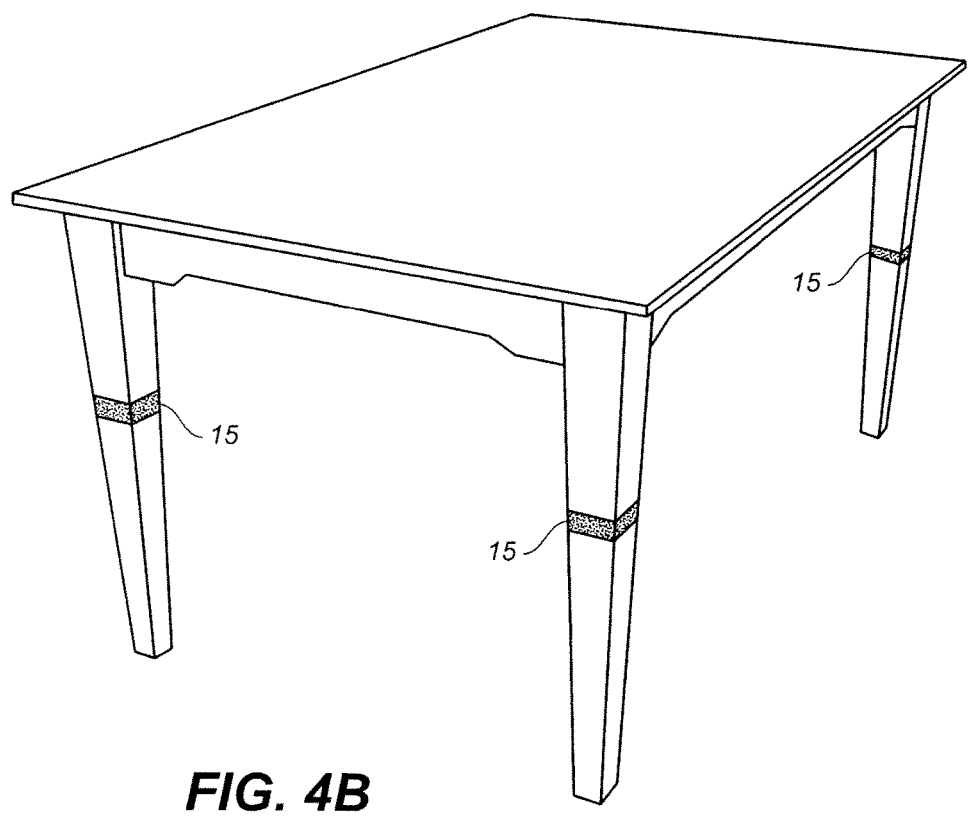
FIG. 4B illustrates a table with a rubber band around each of the legs to illustrate an exemplary means for holding the feather ring in place.

FIG. 4A shows a view of a feather ring crawling insect barrier according to one embodiment of the present invention as used on a table leg. The feather ring 10 is made preferably using an elastic string as its base. The elasticity of the string holds the feather ring snugly around the table leg without falling. The elasticity of the string also functions to prevent the formation or existence of any space between the ring and the table leg that the ants could otherwise use as a substitute passageway. Where the table leg is tapered, or made of a slippery (e.g., metal or plastic), a means for holding the feather ring in place is used. For example, FIG. 4B shows a table with rubber bands 15 surrounding each of the legs. The feather ring 10 will then be placed on top of the rubber band 15 to maintain the feather ring's 10 position on the table leg. Rubber bands are an example of a non-permanent way to hold the feather rings in place without marking or permanently altering the leg or support surface. Other non-permanent, non-marking means for holding the crawling insect barriers in place are also encompassed by the present invention (e.g., suction cups, magnets, static electricity plastics, non-permanent adhesives, etc.).

Figure 5:
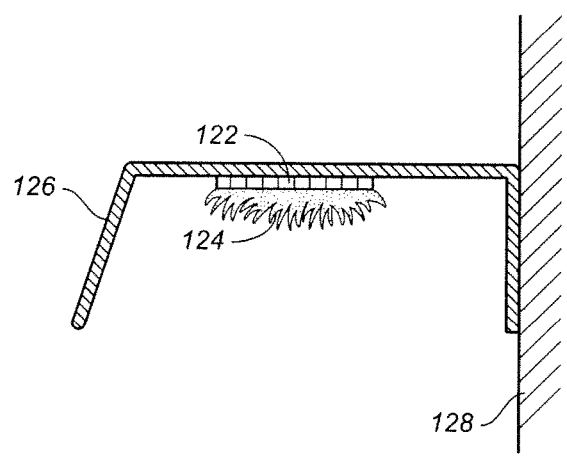
FIG. 5 illustrates a cross-sectional view of an embodiment of an crawling insect barrier formed in the shape of an inverted gutter fastened to a surface to protect the feathers from rain or other moisture.

FIG. 5 illustrates another embodiment of an crawling insect barrier according to the present invention formed in the shape of an inverted gutter to protect the feathers from rain or other moisture if the crawling insect barrier is used outdoors. FIG. 5 illustrates a cross-sectional view of the crawling insect barrier. As seen in FIG. 5, the feather string, band, or strap 122 includes feathers 124 attached thereto. The feather barrier 122 is fastened to the inside of an inverted gutter 126 which is attached to a wall surface or the like 128 to protect the feathers from getting wet. The gutter can be positioned on any outdoors surface and shaped to surround the structure to be protected, e.g., a table or patio area. A three sided plastic or metal strut also could be used.

Figure 6C:
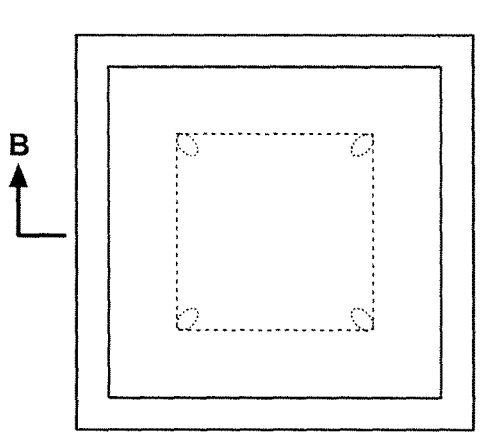
FIG. 6C illustrates the top schematic view of the exemplary table tray.
Figure 6E:
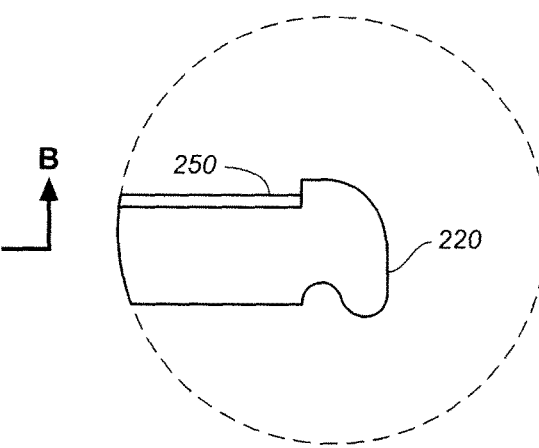
FIG. 6E illustrates an enlarged cross-sectional schematic view of the edge of the table tray.
Figure 6D:
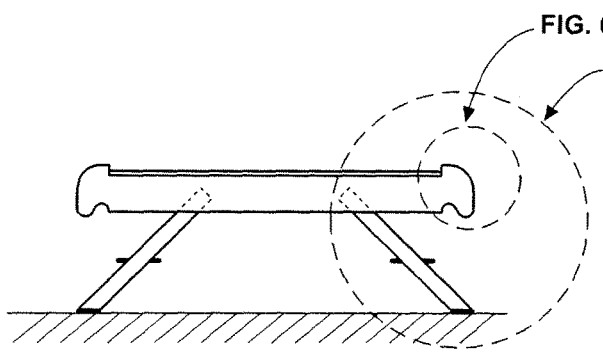
FIG. 6D illustrates a cross-sectional schematic view along the line C of the exemplary table tray.
Figure 6G:
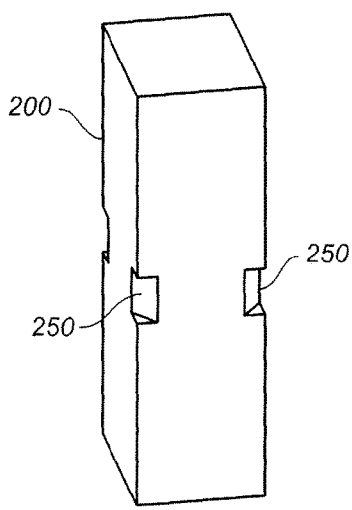
FIG. 6G shows exemplary granite table tray legs with grooves or notches formed in the legs as means for securing the feather ring to the leg, because the feather ring seats in the groove(s) or notches.
Figure 6F:
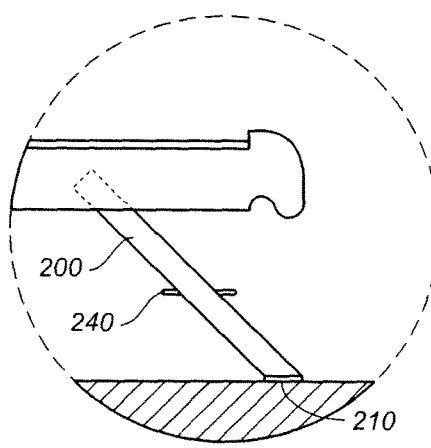
FIG. 6F illustrates an enlarged schematic view of one of the legs of the exemplary table tray.

FIGS. 6A-6F show exemplary embodiments of trays according to the present invention, wherein feather rings are attached to each leg or support structure of the trays. These trays can be used to stop ants and other crawling insects from accessing condiments and appliances. These trays can be any shape. For example, trays may be round, rectangular, square, triangular or free form. They can be made from any suitable material (e.g., wood, metal or plastic). Key features of all trays include legs 200 of suitable thickness for the size of the tray and load to support. The legs can of any shape. As depicted in the drawings, they are preferably set back from the rim of the tray by at least 5 cm to provide overhang protection so water or other moisture will not drip onto the feather rings. The legs 200 may also end in a non-slip material 210. The rim of the tray 220 is designed with an overhang preferably in the shape of a fin on the underside so that water or liquid on the surface of the tray does not trickle over the rim and drip down upon the feather rings, which must be kept dry. Also, the feather rings 230 are preferably positioned on each leg about 3 cm down from the undersurface of the tray in order to allow for the feathers 230 to extend in all directions and to make the insect's distance to traverse across the feathers as lengthy as possible. The feathers 230 are also preferably about 3 cm from the bottom or base to prevent water or other liquids on the bottom surface from getting the feathers 230 wet and also to force the insect to travel the full distance around the feathers 230, e.g., at least 180 degrees (see, for example, FIG. 2E). Each leg 200 may include a means for securing the feather ring 230 to the leg 200. Preferably, one or more grooves 250 are used as the means for securing the feather ring 230 to the leg 200 because the feather ring seats in the groove(s). FIG. 6G shows an exemplary leg 200 of a granite table tray having grooves 250 to secure the feather rings to the leg 200. Preferably, elastic feather rings are placed on the leg 200 in groove(s) 250, such that the feathers are held in place by a combination of elastic tension and the groove(s) 250. Another exemplary means includes, but is not limited to, a pin 240 extending through the body of the leg of about 4 mm in diameter and extending out from the surface of the leg about 5 mm on each side, may be used to help hold the feather rings or straps 230 in place. Alternatively two smaller length pins 240 can be fixed in holes on opposite sides of each leg 200 to provide the same structure. Where a leg 200 is not perpendicular to the support surface, the pins 240 are preferably set to about 5 degrees above parallel with the support surface. The trays may or may not have an additional top surface 250, which can be made of a durable and impermeable material for easy care and cleaning.

Figure 7A:
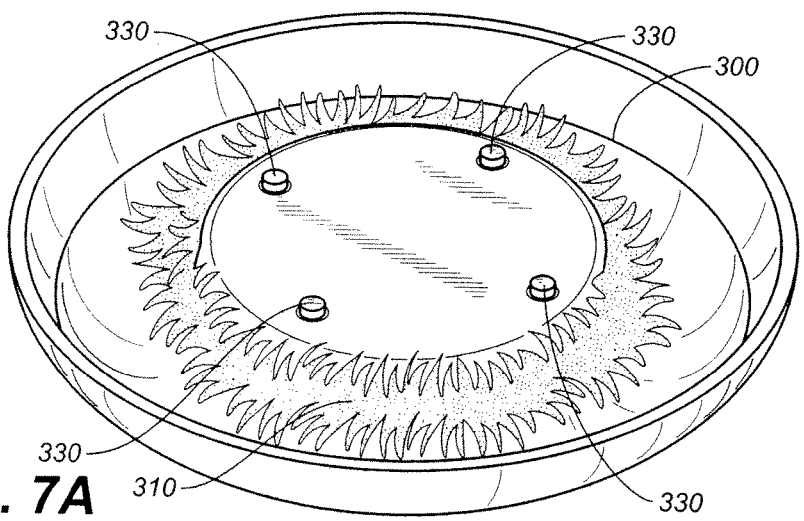
FIG. 7A shows an embodiment of the crawling insect barrier of the present invention, wherein a feather ring is attached to an exemplary plate (e.g., dinner plate).
Figure 7B:
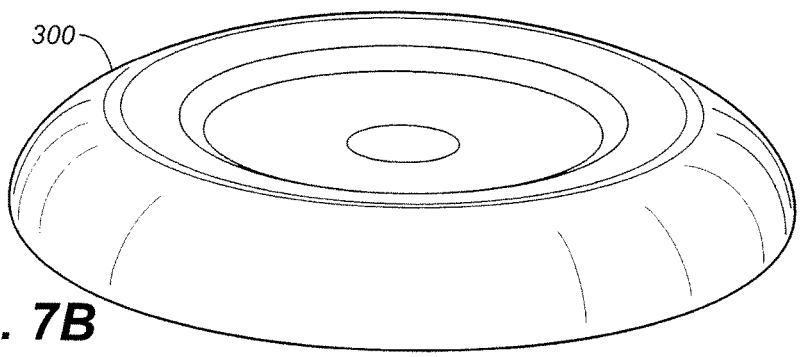
FIG. 7B shows another view of the plate.
Figure 7C:
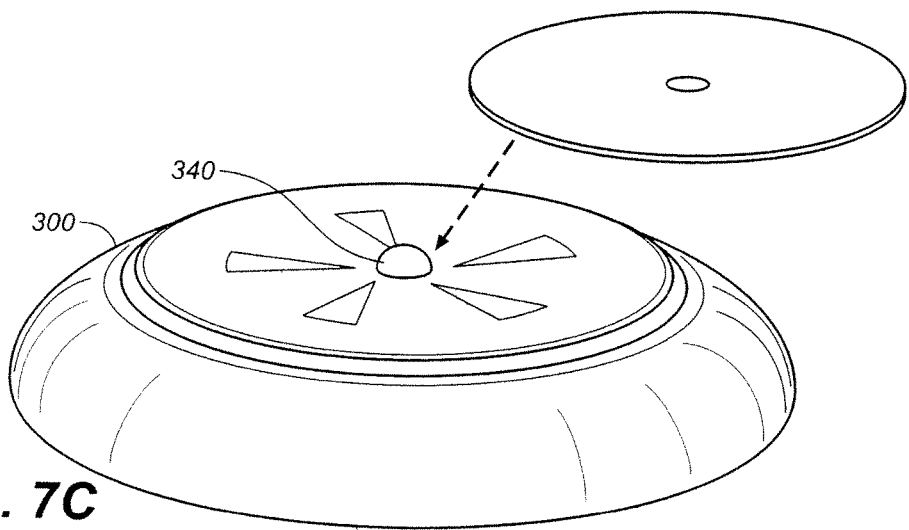
FIG. 7C shows another embodiment of the exemplary plate tray which includes a roller, making, for example, a turn table.
Figure 7D:
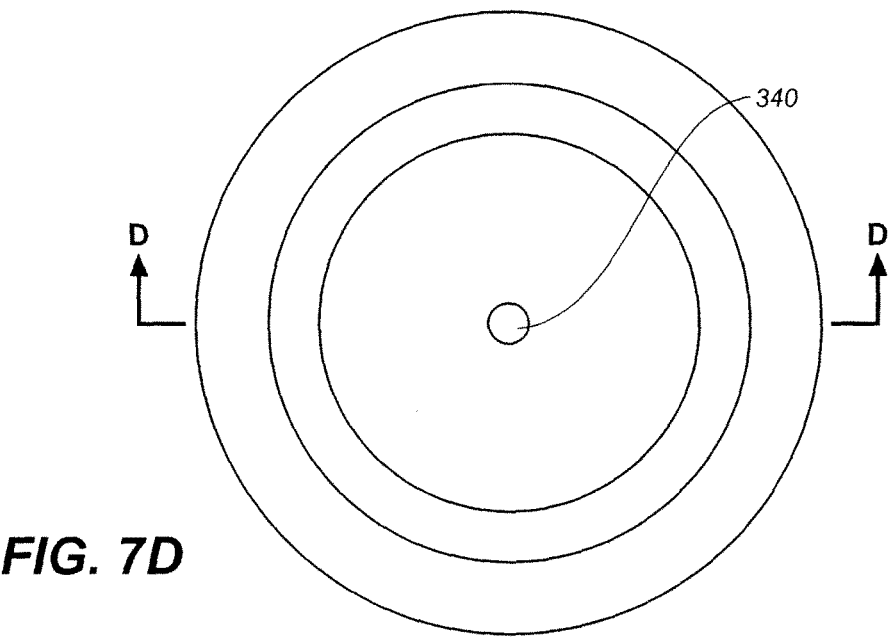
FIG. 7D illustrates the top schematic view of the exemplary turn table.
Figure 7E:
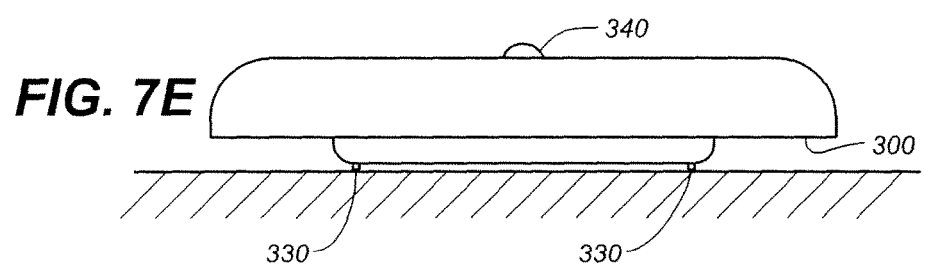
FIG. 7E illustrates a side schematic view of the turn table.
Figure 7F:
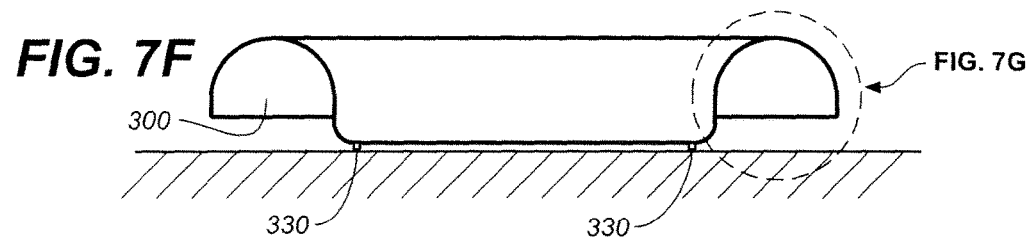
FIG. 7F illustrates a cross-sectional schematic view along line D of the exemplary turn table.
Figure 7G:
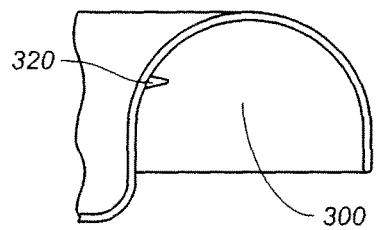
FIG. 7G illustrates an enlarged cross-sectional schematic view of the edge of the exemplary plate tray.
Figure 8A:
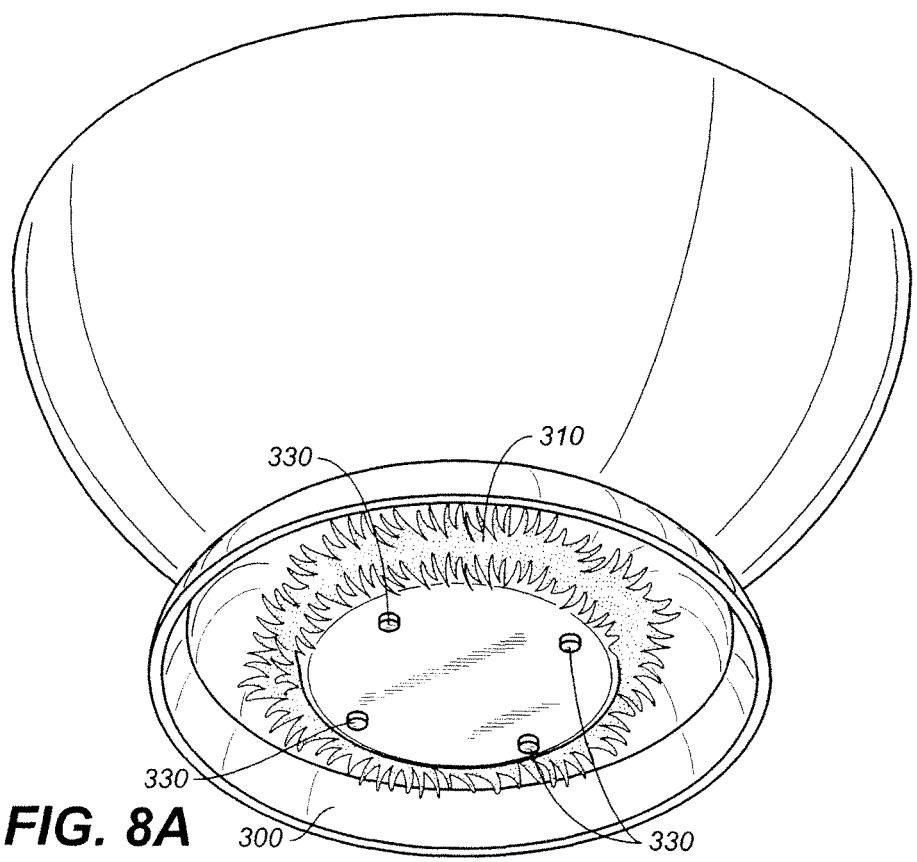
FIG. 8A shows an embodiment of the crawling insect barrier of the present invention, wherein a feather ring is attached to an exemplary tray used with a bowl.
Figure 8B:
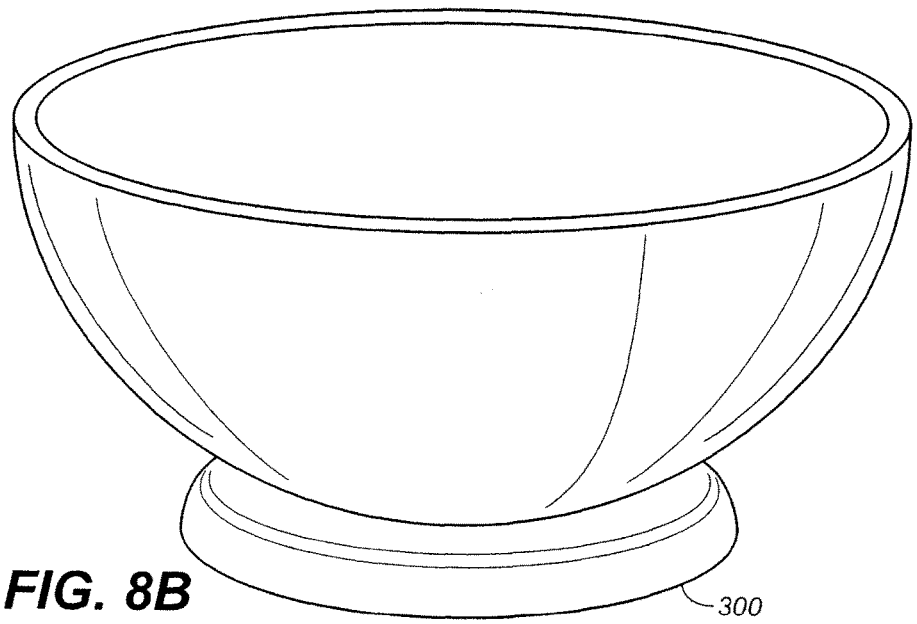
FIG. 8B shows another view of the tray and bowl.
Figure 8C:
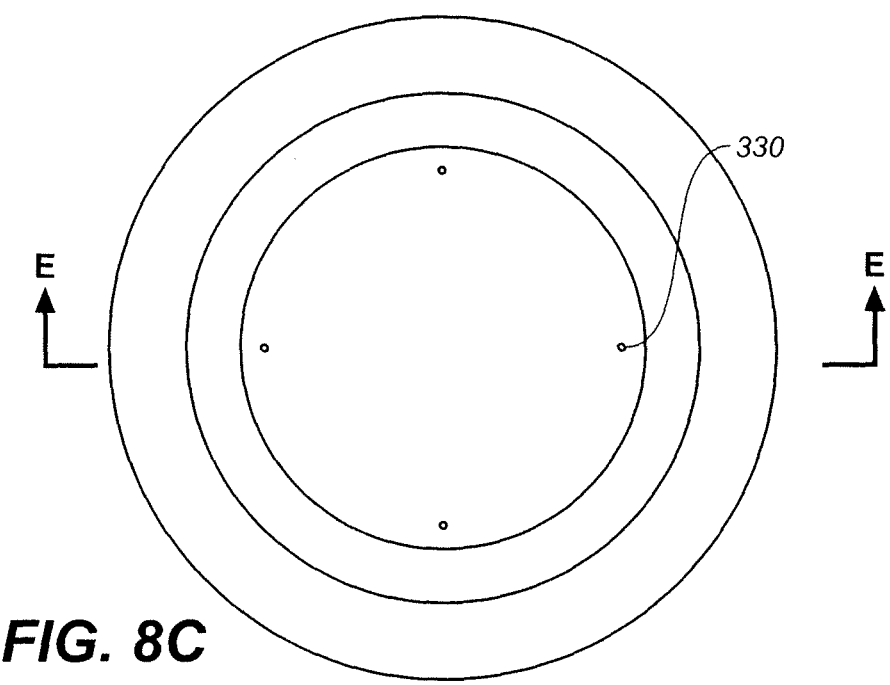
FIG. 8C illustrates the top schematic view of the exemplary plate tray and bowl.
Figure 8D:
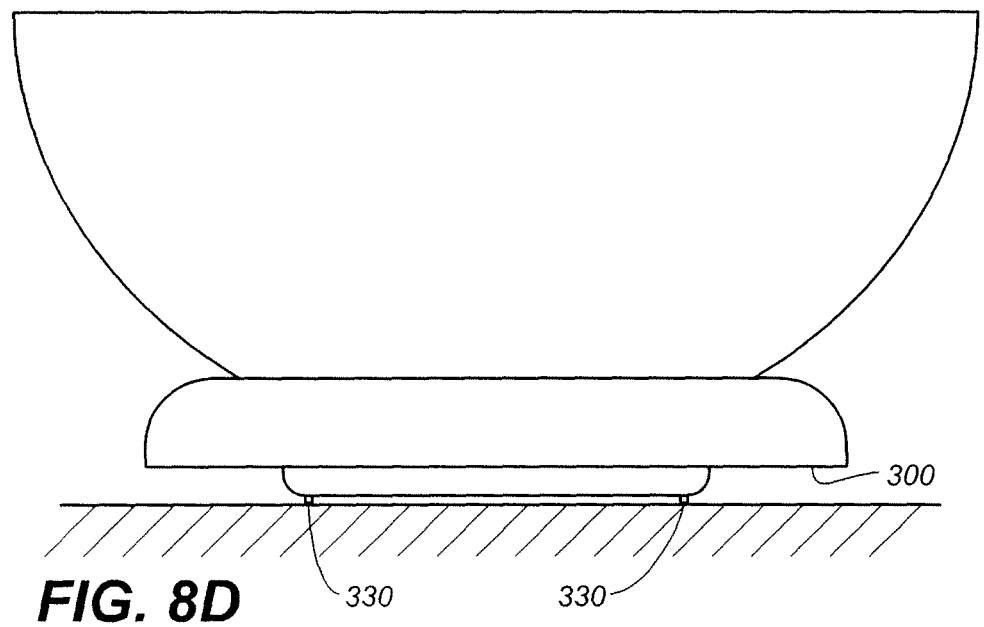
FIG. 8D illustrates a side schematic view of the plate tray and bowl.
Figure 8E:
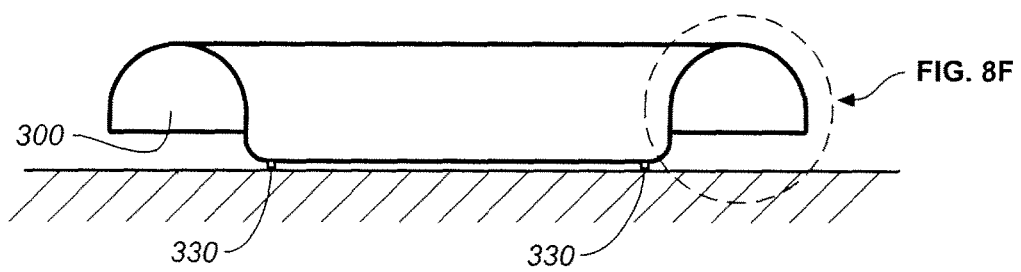
FIG. 8E illustrates a cross-sectional schematic view along line E of the exemplary plate tray.
Figure 8F:
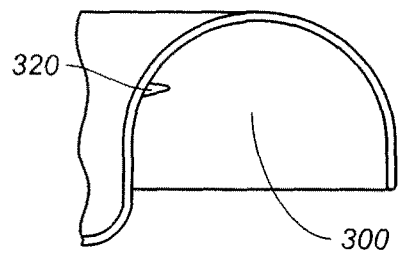
FIG. 8F illustrates an enlarged cross sectional schematic view of the edge of the exemplary plate tray.
Figure 12A:
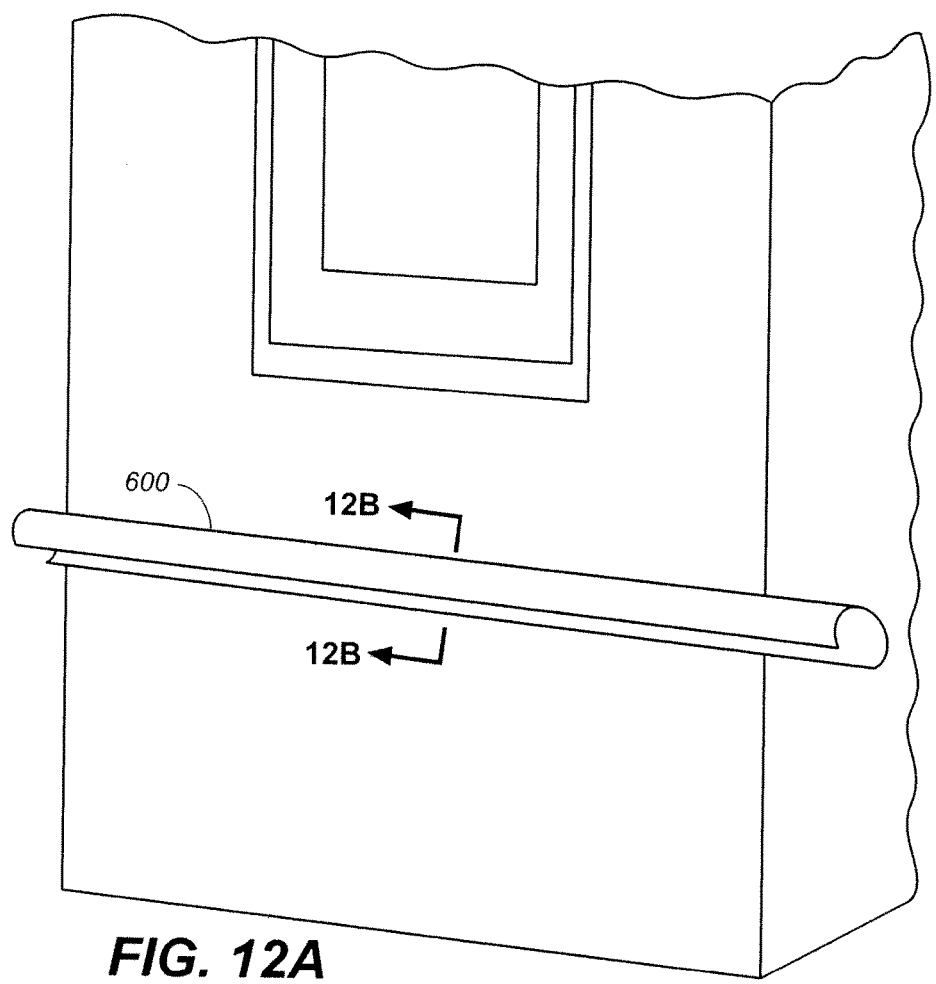
FIG. 12A shows an embodiment of the feather crawling insect barrier of the present invention, wherein a feather strip is attached to the inside of a structure in the shape of an inverted tube, which is opened longitudinally, and connected to a structure.
Figure 12B:
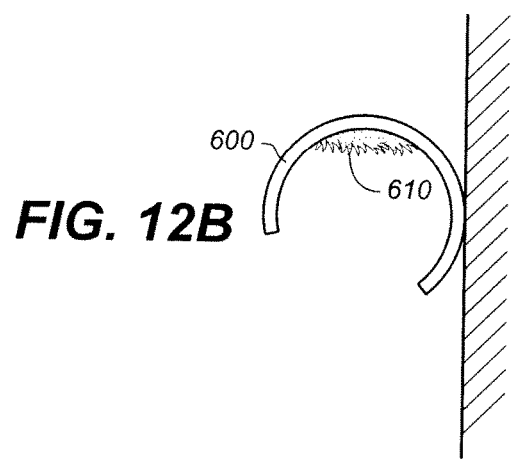
FIG. 12B is an enlarged plan view of a section of the tube-shaped crawling insect barrier.

FIGS. 7A-7G and 7A-8F show exemplary embodiments of plates, trays, bowls and turntables, according to the present invention, wherein a feather ring is attached to a stand or support for the plates, trays, bowls or turntables. These plates, trays, bowls, and turntables prevent ants and other crawling insects from accessing food in or on these various surfaces/containers. Underneath, these embodiments share the same basic key features. They can be made into a variety of shapes and made from different materials such as, for example, plastic, ceramic, metal, glass, composites (safe for microwave), etc. They preferably have an approximately 2 inch diameter channel 300 under and around the rim of the item. The feather ring or strap 310 may be held in place by any means. Preferably, a groove is used as the securing means. Another exemplary means includes, but is not limited to a retaining ridge or bar 320, e.s., as shown in FIG. 7E. This allows easy removal of the feathers 310 for cleaning the bowl or plate. They may have small non-slip feet 330. As shown in FIGS. 7A-7B, the dinner plate is a typical individual serving plate; however, a much larger version could be made and used by multiple people for snacks, chips, appetizers, etc., for picnics or outdoor gatherings around the pool. The turntable of FIG. 7C-7G could be of any size and use numerous different gears and/or rollers 340 for ease of turning. The bowl shown in FIGS. 8A-8F is a large bowl to keep a variety of foods and could be shaped in a more flattened casserole shape as well. For a complete picnic set, a container could be designed to keep silverware, cups, etc., and placed upon a sheet or tray with the same basic underside shape as the pet food bowl with the feathers 310 keeping the ants away.

Leg attachments may also be used to elevate appliances or cabinets or any other apparatus above where ants tend to access. One leg attachment 400, as depicted in FIGS. 9A-9C, includes legs (the first two are shown) for elevating a microwave. The paths that insects can use is thereby reduced to the four paths formed by the four legs, such that only four feather barriers according to the present invention are needed to prevent access to the microwave. The leg is attached to the bottom of the appliance by any means, for example, with screws or glue or epoxy. The leg may include a means for securing the feather ring 420 to the leg attachment 400. Preferably, a groove is used as the means for securing the feather ring 420 to the attachment 400. Another exemplary means includes, but is not limited to, a retaining pin 410 positioned so that the feathers 420 are allowed to plume as much as possible without hitting the bottom surface of the appliance and such that the feathers are preferably at least 3 cm from the surface of the counter. The leg attachment 400 also will typically include a non-slip rubber or plastic foot 430.

Another leg attachment 440 according to the present invention is shown in FIGS. 10A-10E. This leg attachment 440 is hollow and is placed over a leg of any structure (e.g., food storage cabinet, etc.). The legs of some structures are grooved or odd-shaped (such as a basic L shape), and those grooves or shapes would allow ants or other crawling insects to walk beneath any feather rings 420 placed upon them. This leg attachment 440 could, instead, be slipped over the structure's leg and the feather ring 420 installed on the outer surface of the attachment 440. The feather ring 420 may be held in place by any means, including, but not limited to a pin 410. The leg attachment 440 is held in place by the weight of the structure and may include a non-slip foot 430.

An exemplary elevated counter according to the present invention, as shown in FIGS. 11A-11D, is designed to prevent ants and other crawling insects from accessing counters of all types, for example, in the kitchen, dining rooms, cafeterias, storage counters, offices, laboratories, hospital supply stations and counters, bathrooms, etc. The elevated counter is separated from all walls or adjacent structures preferably by at least 2.5 cm. The counter is elevated by support permanently or non-permanently attached to columns 500 of appropriate size for the load and length of the counter. The support columns 500 can be of any shape, such as square, rectangular, circle, or free form, for example. The columns 500 can be made out of any suitable material, such as, for example, plastic, wood, metal, etc. Each column 500 is set back preferably at least 5 cm from the rim 510 of the counter to prevent liquid spilling on to the feathers 520. The rim 510 of the counter includes an overhang and is shaped preferably like a fin to prevent water seeping and dripping onto the feathers 520 beneath. The column 500 is preferably at least 15 cm to allow reaching the rear columns to places or replace the feather rings or straps 520. The elevated counter can also be used as an effective barrier for rodents and other pests. If the columns 500 are made of a slippery material (e.g., metal) or have a slippery coating, the rodents and other pests are unable to climb up the slippery support column.

Another embodiment of the present invention is the exemplary outdoor tube 900, as shown in FIGS. 12A-12D. This tube 600 is similar in function and has many of the same key features as the inverted gutter, above. The tube 600, however, adds flexibility and allows it to be deployed at various angles upwards or downwards along the surface of a wall depending upon where windows or other obstructions are encountered. The tube 600 is preferably at least 2" in diameter to allow a feather strap 610 inside to fully plume and maximize the distance the ant must travel to circumnavigate the feathers 610 and cross the tube barrier 600. The tube 600 can be made out of any suitable material including, for example, plastic, rubber, flexible PVC, etc. It can be cut and installed with a screw about every 30 cm along the wall. To seal any crawl spaces between the screws, a silicone sealant (or another suitable material) can be used to close any gaps between the tube and wall structure. While the most likely application would be for outdoor use, the tubes 600 could be used anywhere along walls, around trees, appliances, trailer homes, boats, hot tubs, pools, buildings, cabinets, windows, or any other structure where moisture might reach the feather straps and rings 610 and render them useless until dry.

Figure 13B:
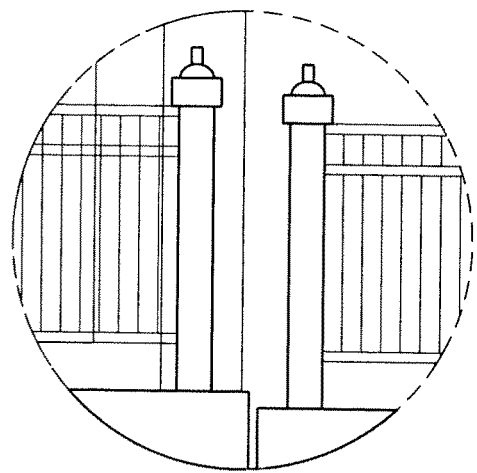
FIG. 13B is a detailed view of the gap between the house and adjacent stairs leading to the house shown in FIG. 13A.
Figure 14A:
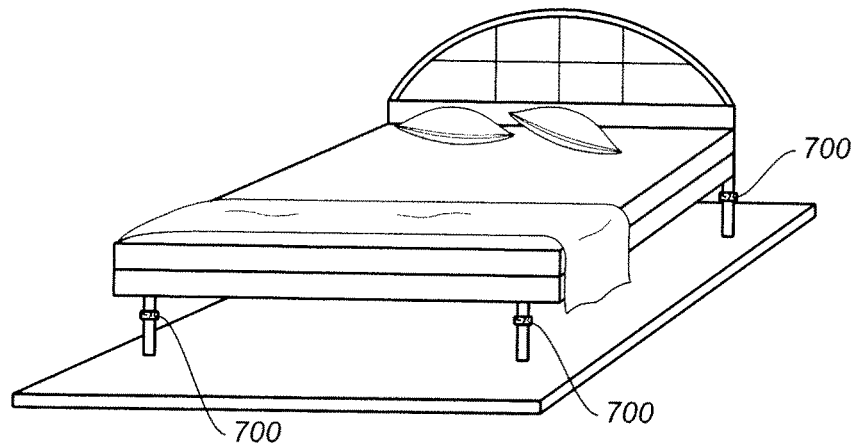
FIGS. 14A-14B show views of the feather ring as used on various furniture according to an embodiment of the crawling insect barrier of the present invention.
Figure 14B:
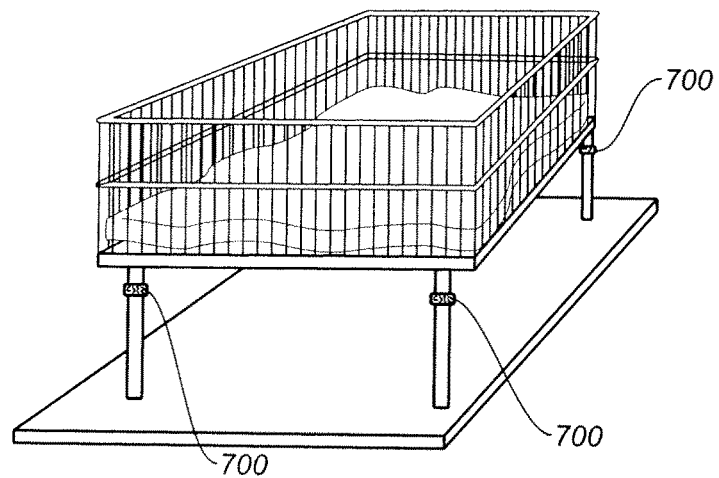

FIGS. 13A and 13B and FIGS. 14A-14B, show various other embodiments according to the present invention. These figures depict a house (FIG. 13A), a bed (FIG. 14A) and a crib (FIG. 14B) using feather rings or straps 700 to prevent ants from crossing the feather barrier. In the case of the house shown in FIG. 13A, it is elevated by support pillars 710, each having a feather barrier 700, and the stairs 720 leading to the house are separated from the house by preferably at least 2.5 cm to stop ants from climbing the stairs and entering the house via that path. FIG. 13B is a detailed view of the gap between the house and adjacent stairs 720 leading to the house. The crib and bed are further examples of using feathers 700 as crawling insect barriers.

Figure 15A:
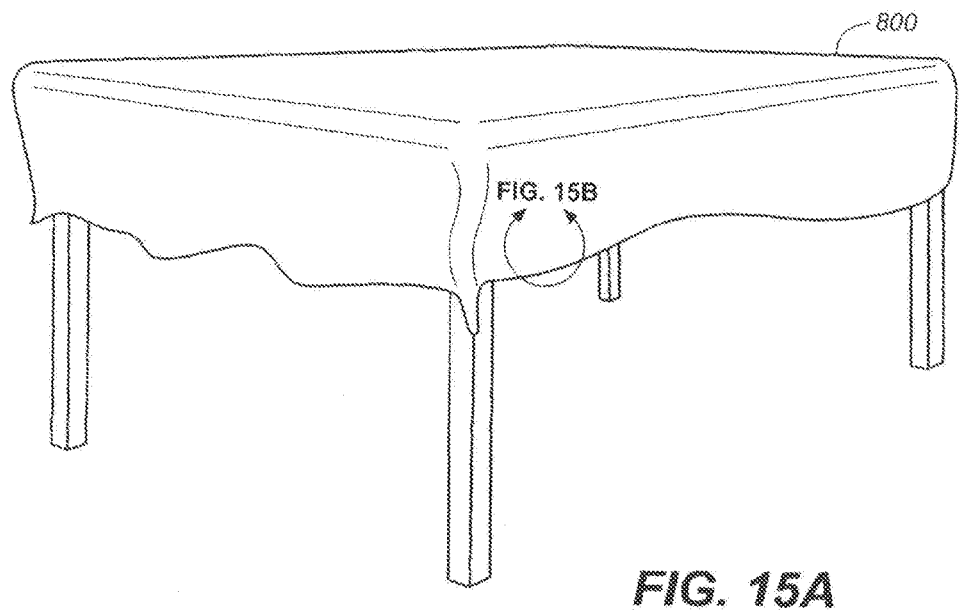
FIG. 15A shows an embodiment of the crawling insect barrier of the present invention, wherein a feather strap is attached near each edge of the underside of an exemplary table cloth.
Figure 15B:
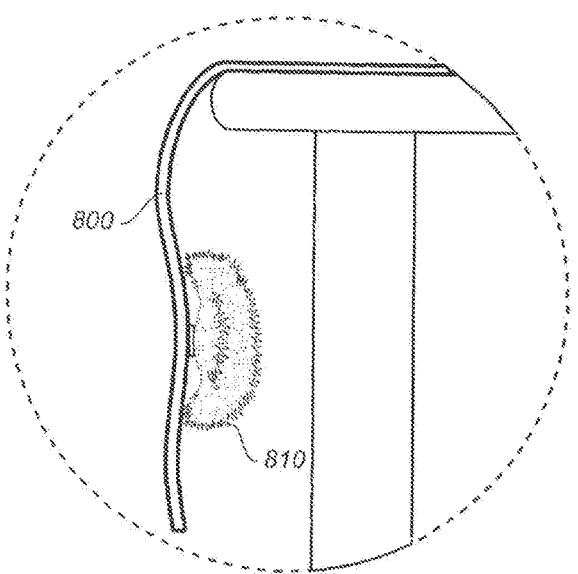
FIG. 15B shows an enlarged cross-sectional schematic view of one of the edges of the table cloth.

FIGS. 15A and 15B shows an exemplary embodiment of a tablecloth 800 according to the present invention. This tablecloth 800 prevents ants from crawling up onto the table and is an option to using rings placed on the table legs. A feather strap 810 is attached around the inside base of the tablecloth 800. It could be attached permanently by sewing it or by a self-adhesive strap. Alternatively, it might be detachable by using a Velcro type mounted feather strap and the other side of the Velcro sewn permanently onto the tablecloth 800. The feather strap 810 is preferably attached to the underside of the tablecloth 800 out of view and away from dripping liquids. The tablecloth 800 can be made of plastic, fabric, or any other suitable material.

Figure 16A:
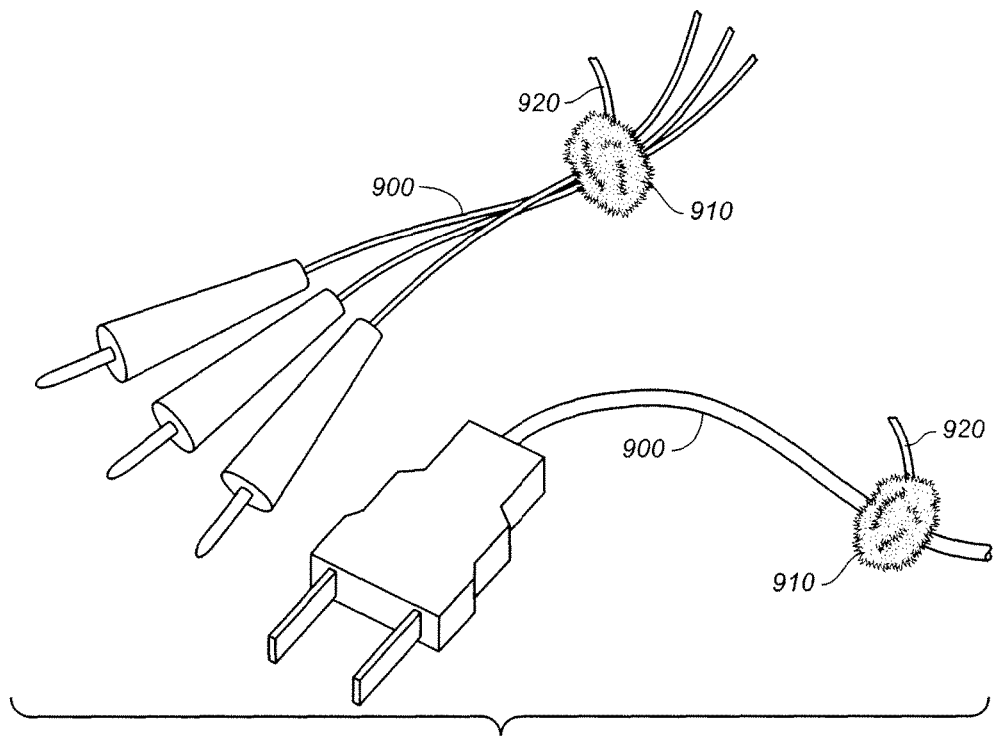
FIG. 16A shows an embodiment of the crawling insect barrier of the present invention, wherein a feather ring is wrapped around various wires to prevent crawling insects and other crawling insects from using the cable wires as a walkway.
Figure 16B:
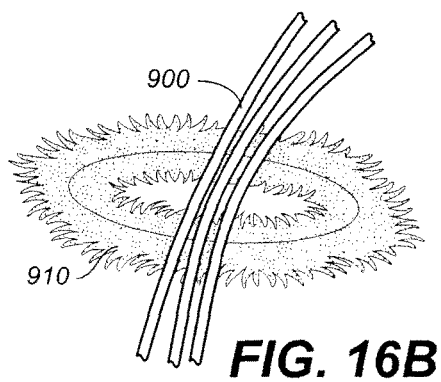
FIGS. 16B-16D show the steps for attaching a feather ring around the cable wires.
Figure 16C:
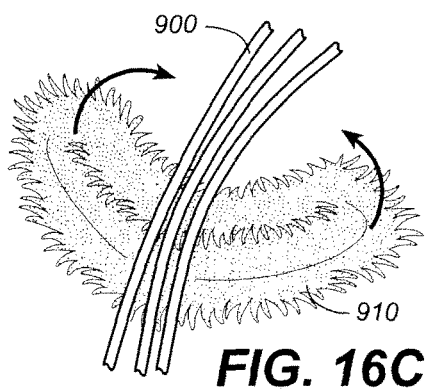
Figure 16D:
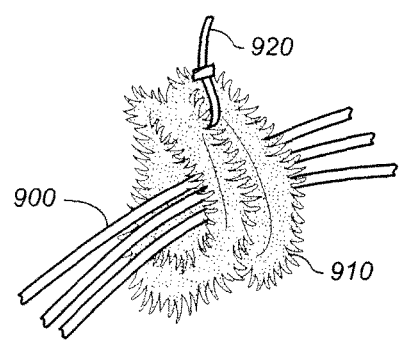

Crawling insect barriers of the present invention may be used to wrap, bundle, or tie cables or wires 900 as shown in FIG. 16A. The use of a feather ring or strap 910 to wind around a wire or cable prevents ants from using the cable or wire 900 as a walkway. One easy method of attaching the feathers is by using a feather ring 910 and using a cable tie 920 to secure it around the cable or electrical wire 900 (FIGS. 16B-16D).

Figure 17:
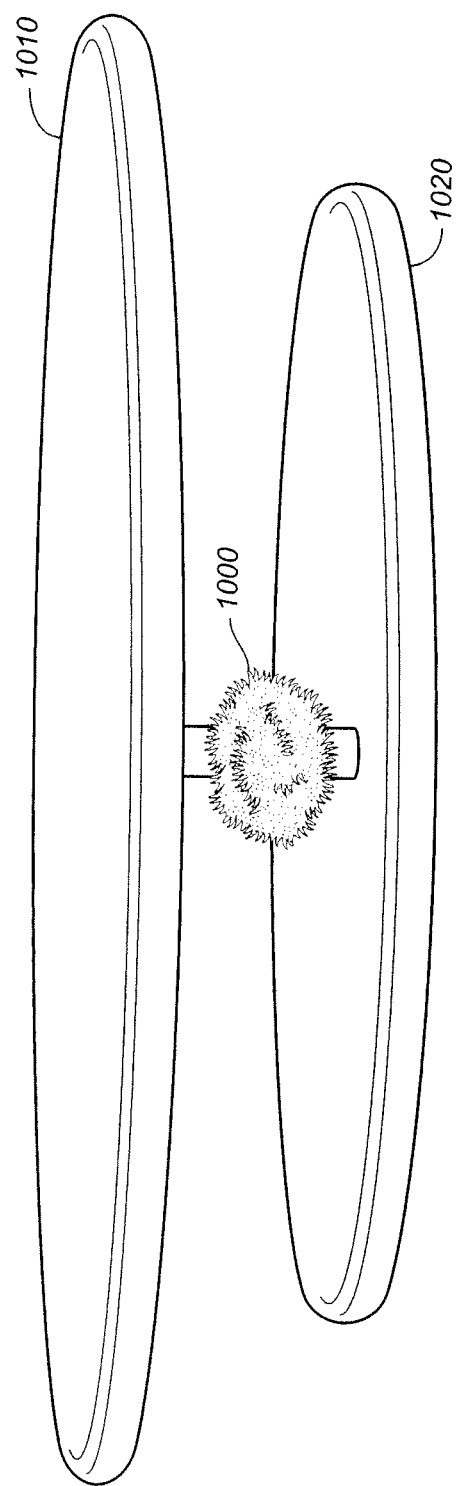
FIG. 17 shows an embodiment of the crawling insect barriers of the present invention, wherein a feather ring is attached to a support of an exemplary saucer tray.
Figure 18A:
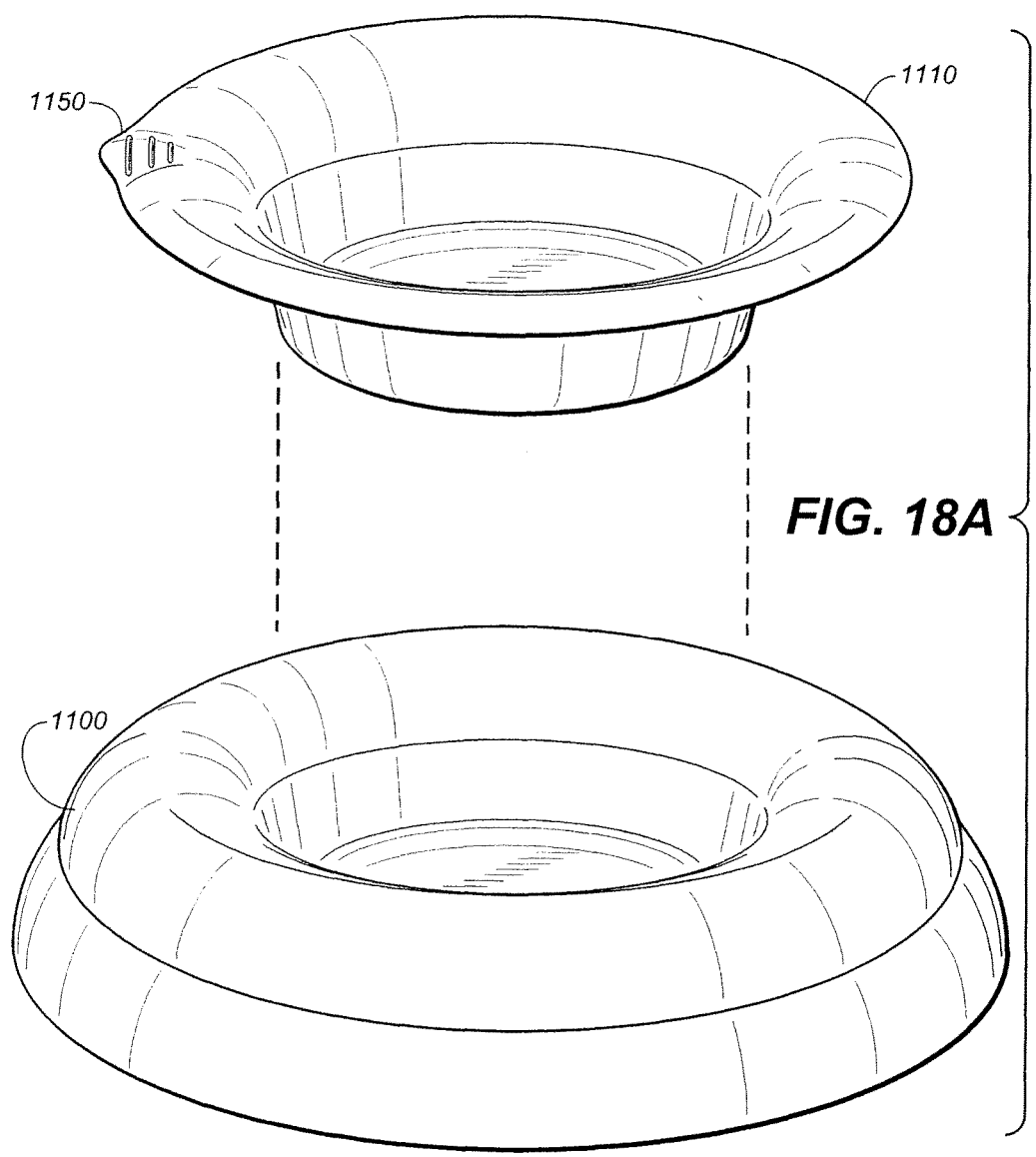
FIGS. 18A-18M show another embodiment of the crawling insect barrier of the present invention, wherein a feather ring is attached to an exemplary bowl support (e.g., a pet food bowl stand) with a removable bowl that can be inserted therein (e.g., an insert bowl).
Figure 18B:
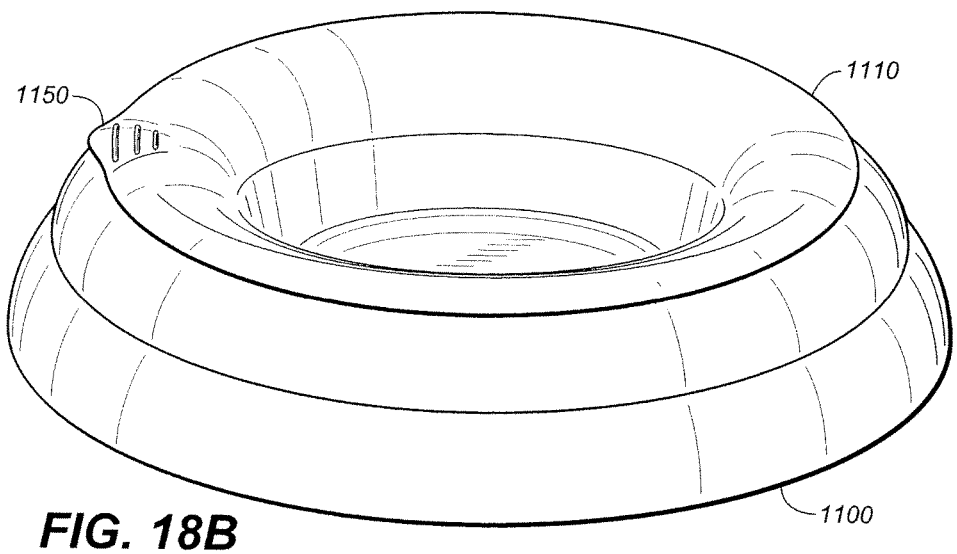
Figure 18C:
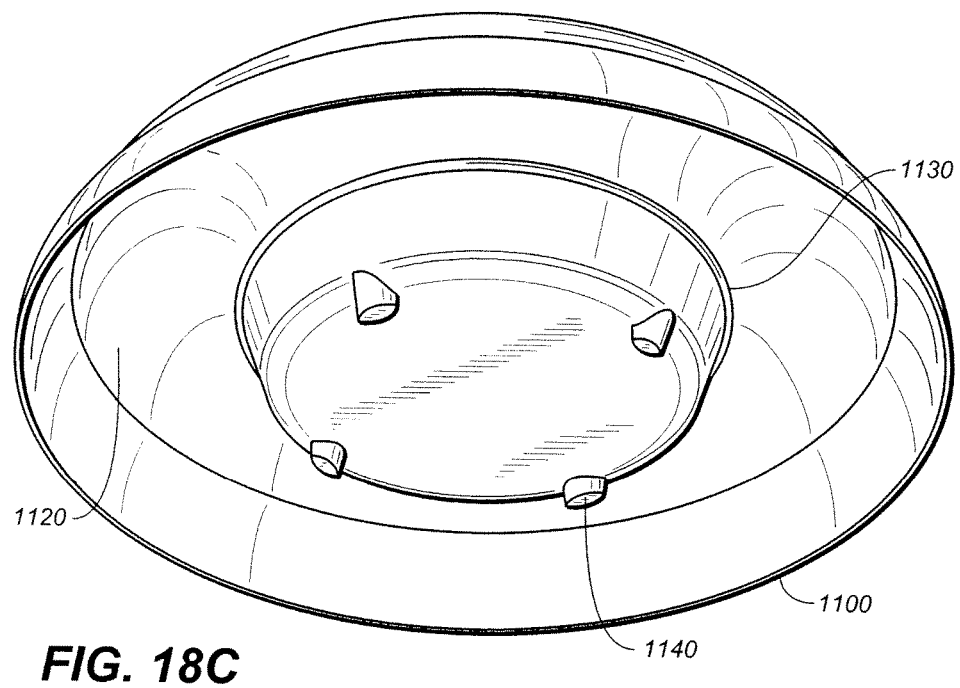
Figure 18D:
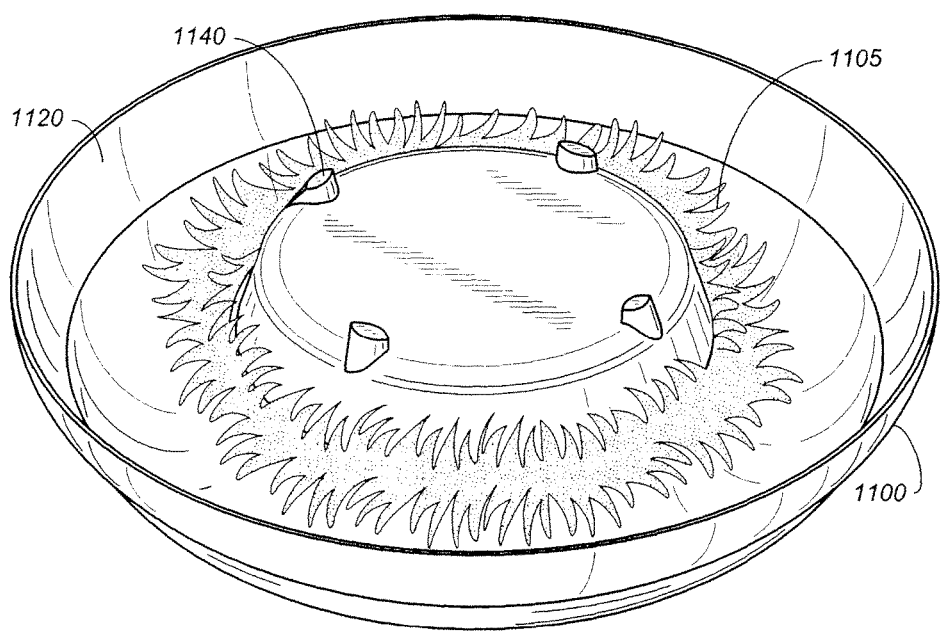
Figure 18E:
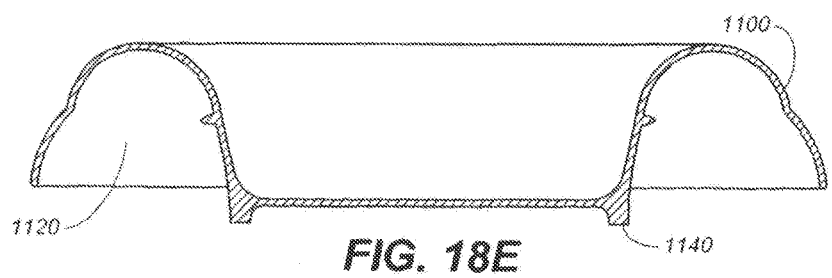
Figure 18:
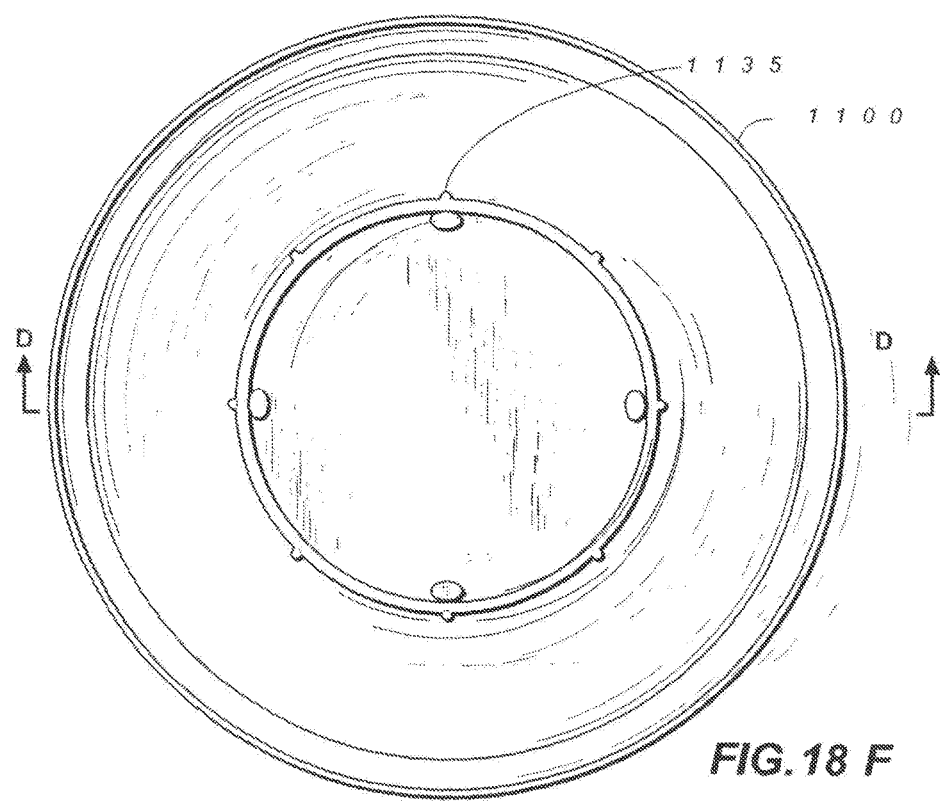
Figure 18G:
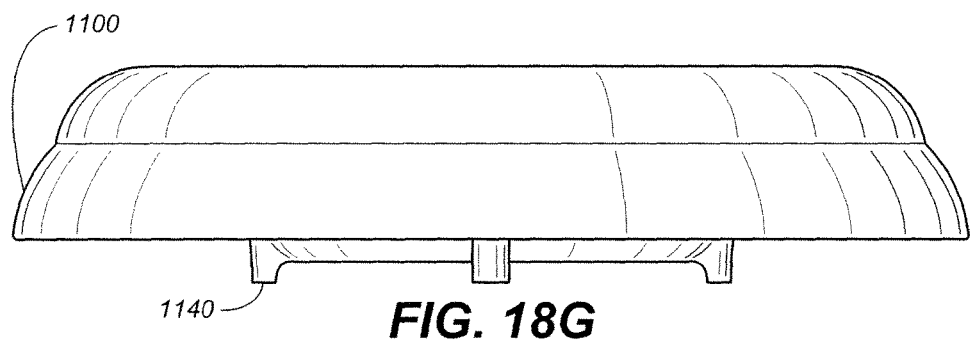
Figure 18H:
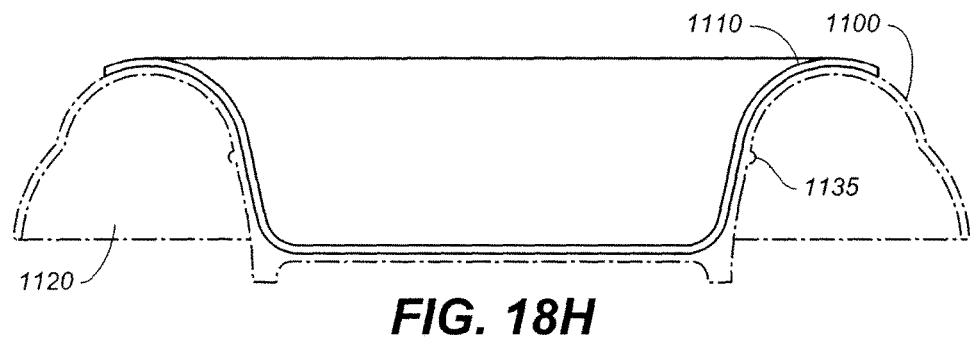
Figure 18I:
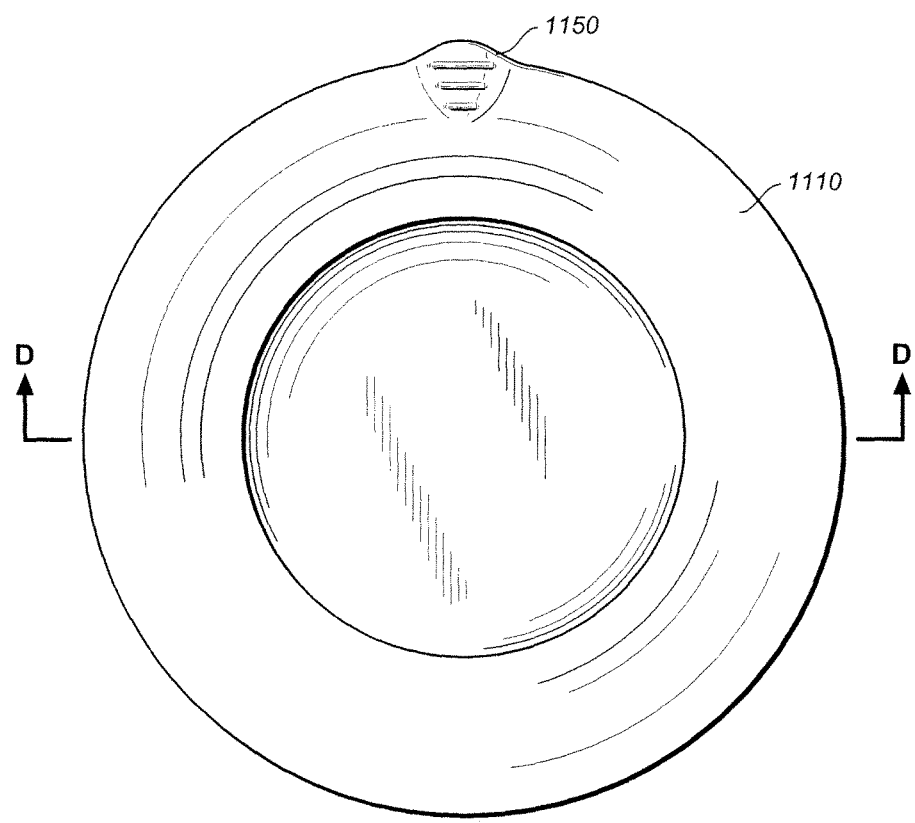
Figure 18J:
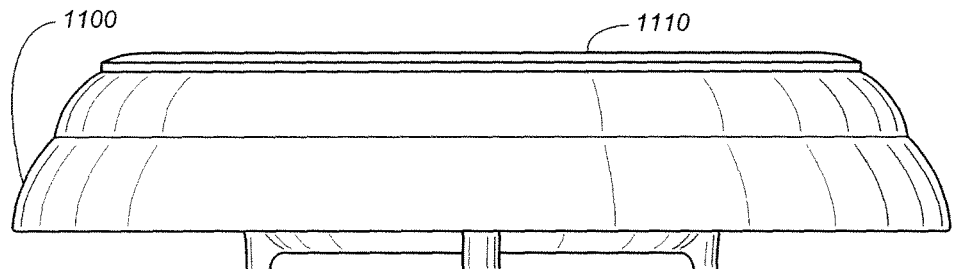
Figure 18K:
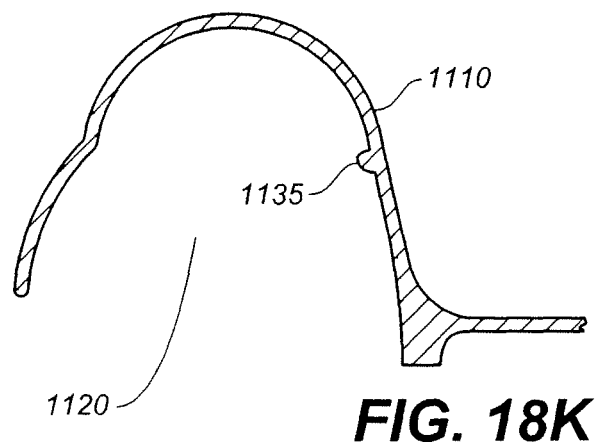
Figure 18L:
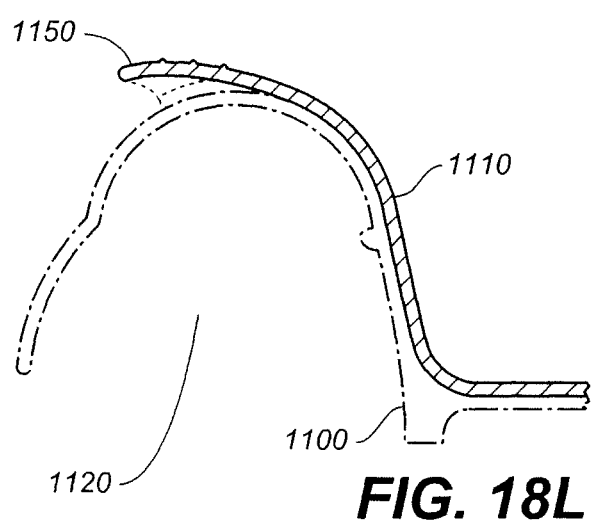
Figure 18M:
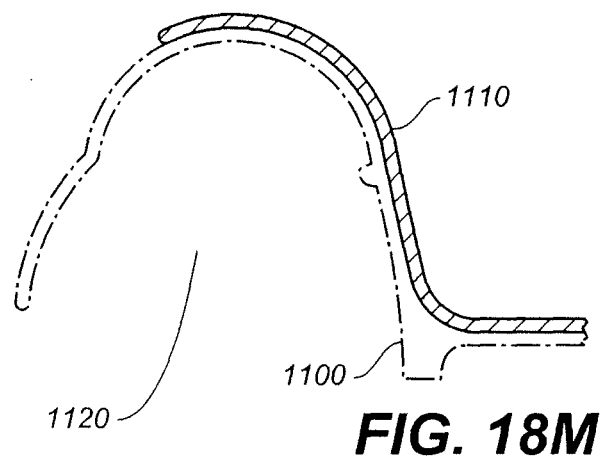
Figure 19A:
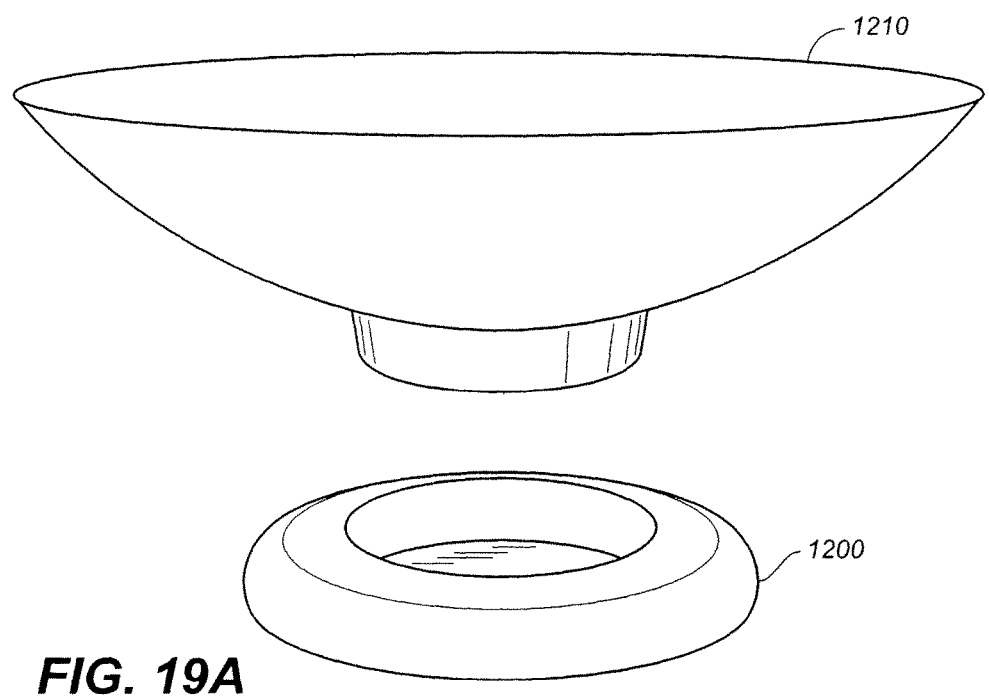
FIG. 19A shows another embodiment of the crawling insect barrier of the present invention, wherein a feather ring is attached to an exemplary receptacle used with a bowl.
Figure 19B:
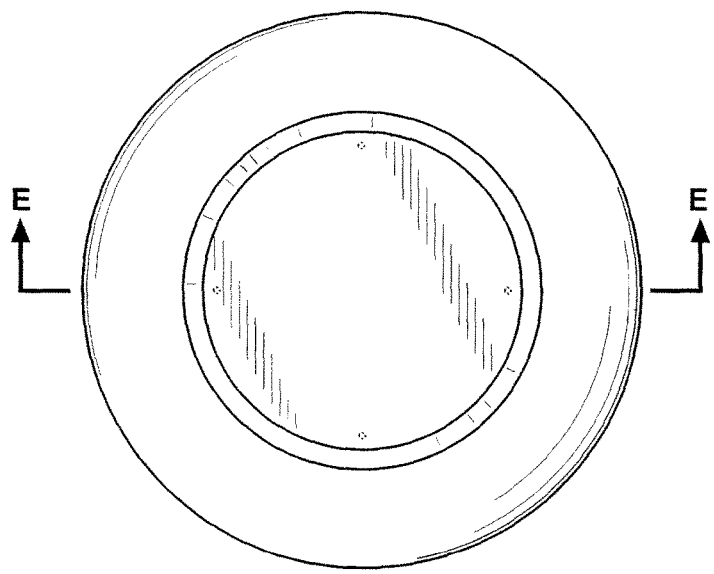
FIG. 19B illustrates the top schematic view of the exemplary receptacle and bowl.
Figure 19C:
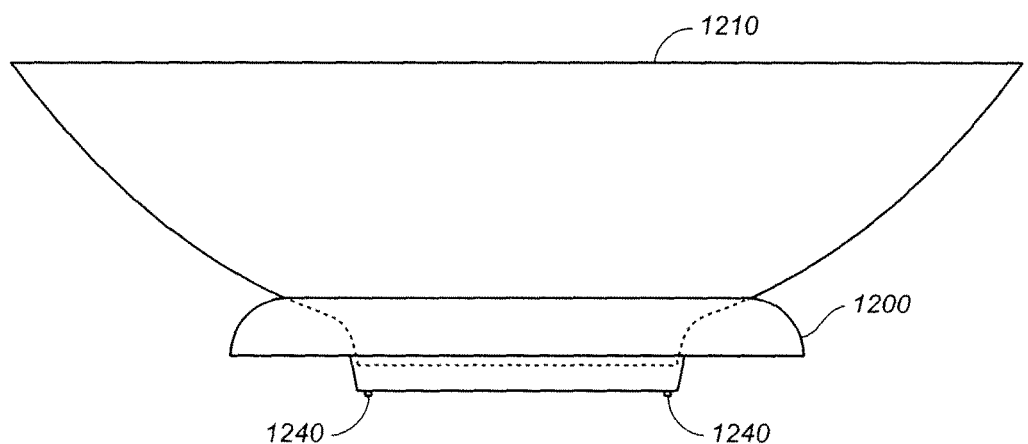
FIG. 19C illustrates a side schematic view of the receptacle and bowl.
Figure 19D:
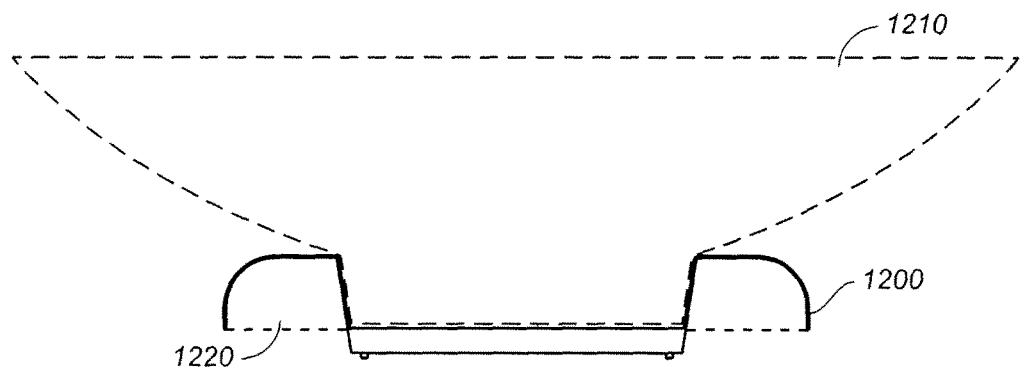
FIG. 19D illustrates a cross-sectional schematic view along line E of the exemplary receptacle and bowl.
Figure 19E:
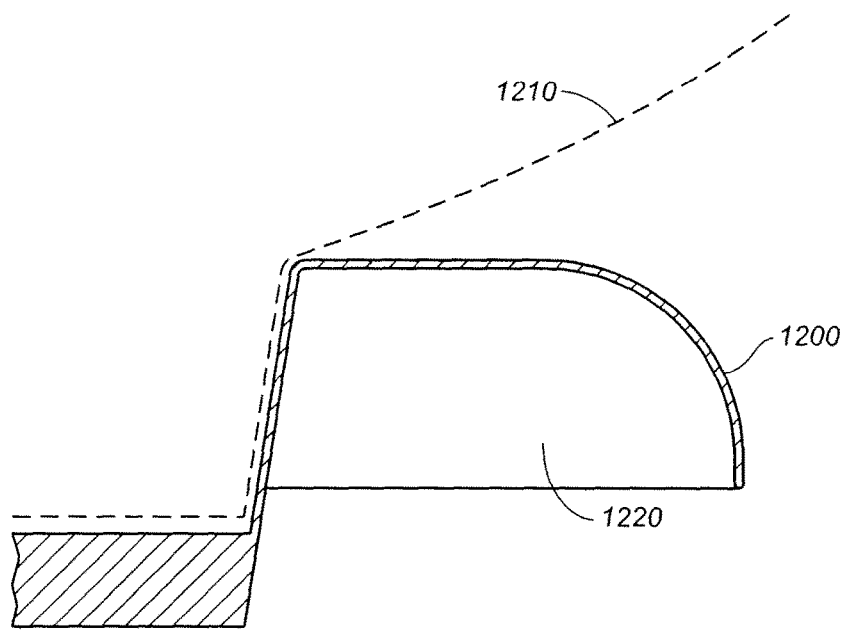
FIG. 19E illustrates an enlarged cross sectional schematic view of the edge of the receptacle and bowl.

FIG. 17 shows an exemplary saucer tray according to the present invention. This saucer tray is another method to prevent ants from accessing food placed on the tray or condiments such as sugar in the cups above. The saucer tray uses as few as one feather ring 1000 and may feature a top piece 1010 and a bottom piece 1020, which may detach from each other. The top piece 1010 may have a small shaft that fits into a hollow tube inside the bottom piece 1020, or vice versa. This allows for easy cleaning of the top piece 1010 without getting the bottom piece 1020 wet. The rim of the top portion includes an overhang that may be shaped like a fin so as not to allow water to drip down upon the feathers.

FIGS. 18A-18M show exemplary embodiments of a pet food bowl, according to the present invention, wherein a feather ring is attached to the underside of a stand or support 1100 and a removable insert bowl 1110 is placed in a receptacle on the stand or support. The insert bowl 1110 can then be easily removed from the support 1100 for cleaning. The feather ring 1105 is removably attached to the underside of support 1100. The benefit of this structure is that the feather ring does not need to be removed from the support 1100 each time the bowl needs to be cleaned. This prevents any decrease in effectiveness of the feather ring due to a weakening of the underlying material used to attach the feather ring to the support 1100 (e.g., weakening of the elastic band, adhesive, tape, etc.). Furthermore, removal of the insert bowl 1110 for cleaning significantly reduces the risk of getting the feathers on the feather ring wet or dirty, either of which would result in a reduction in the effectiveness of the feather barrier. An additional benefit of the shape of the support 1100 is that the feather ring is not visible to the pet, and therefore it is less likely the pet will bite, chew, play with or otherwise tamper with the barrier, which would likely decrease the barrier's effectiveness. Furthermore, the shape of the support 1100 also serves to protect the delicate feathers from moisture, food or other particles and keep them cleaner. By protecting the feathers in this way, the feathers retain their downy characteristics for a longer period of time, and therefore increases the longevity of the crawling insect barrier.

The support 1100 may be made into a variety of shapes and made from different materials, such as, for example, plastic, ceramic, metal, glass, composites (safe for microwave), etc. The support features an upside-down channel around the bowl's outer rim 1120 to place the feather barrier. The cross-sectional shape of this channel may be of any shape (e.g., semicircular or stacked curves as shown in FIGS. 18A-18M, parabolic, angular, etc.). The feather barrier is held in the channel 1120 by any method that retains the feather barrier in the channel 1120 but allows for easy and rapid removal of the feather barrier. Exemplary methods include structures in the channel 1120 of the support 1100 such as ridges or bars 1130, projections 1135, or other structures (e.g., dowels, pins, dots, pegs, hooks, grooves, etc.). These methods for retaining the feather barrier in the channel 1120 may also be used in any of the other embodiments of this invention.

The support 1100 may also have non-stick feet 1140 to help it grip the floor.

The insert bowl 1110 may include a feature 1150 to ease removal of the insert 1110 from the support 1100. The insert bowl 1110 may be of any shape, such that the feather barrier attached to the support 1100 prevents ants from accessing the insert bowl 1110. The insert bowl preferably is of a shape that extends past the highest point of the support 1100 (see, for example, FIG. 18M). This decreases the chance of food particles or pet drool from contacting the support 1100, which, in turn, decreases or substantially eliminates the need to wash the support 1100.

FIGS. 19A-19E show additional exemplary embodiments of a large bowl according to the present invention, wherein a feather ring is attached to a stand or support 1200 and a removable insert bowl 1210 is placed in or on the stand or support. The large bowl of FIGS. 19A-19E is similar to the bowl shown above with respect to FIGS. 8A-8F. However, FIG. 19A clearly shows that, like the pet food bowl shown above with respect to FIGS. 18A-18M, the large bowl 1210 can be easily removed from the support 1200 for cleaning. The support 1200 shares a number of the same basic key features of the pet food bowl described above with respect to FIG. 39. The support 1200 may be made into a variety of shapes and made from different materials, such as, for example, plastic, ceramic, metal, glass, composites (safe for microwave), etc. The support 1200 features an upside-down channel around the bowl's outer rim 1220 for placement of the feather barrier. The cross-sectional shape of this channel may be of any shape (e.g., semicircular, stacked curves as shown in FIGS. 18A-18M, parabolic, angular, etc.). The feather ring is held in place by a ridge or bar 1230 in the channel 1220, that helps retain the feather ring but allows for easy and rapid removal of the feather ring, if needed. The support 1200 may also have non-stick feet 1240 to help it grip the floor. The insert bowl 1210 may be of any shape, such that the feather barrier attached to the support 1200 prevents ants from accessing the insert bowl 1210.

The invention is not limited to one feather barrier per bowl, tray, turntable or support, as exemplified in FIGS. 7-8 and 18 and 19. For example, the support 1100 in FIG. 18 may be shaped to accommodate more than one insert bowl 1110, where one or more feather barriers are installed to protect the insert bowls.

Figure 20A:
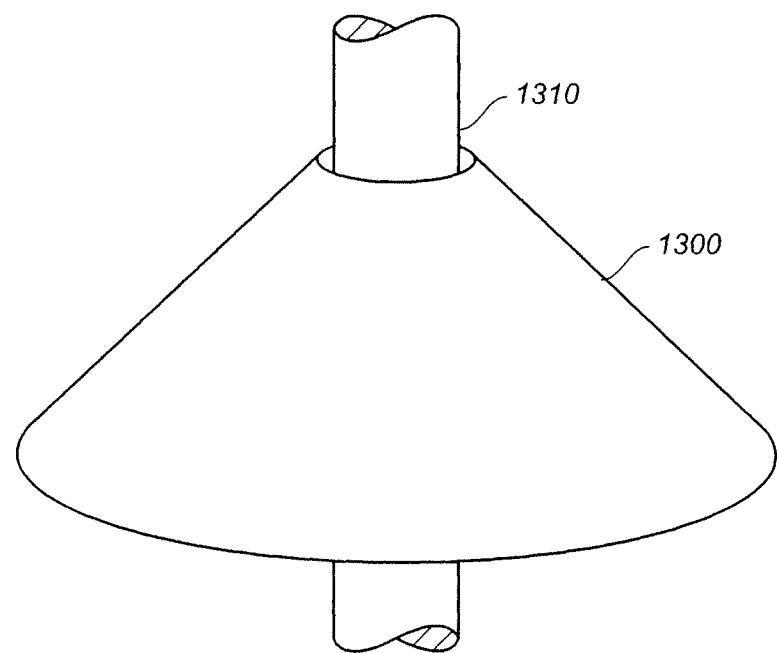
FIGS. 20A-20B illustrate an embodiment of the present invention where the downy-bases are attached to the underside of a moisture barrier in the form of a cone.
Figure 20B:
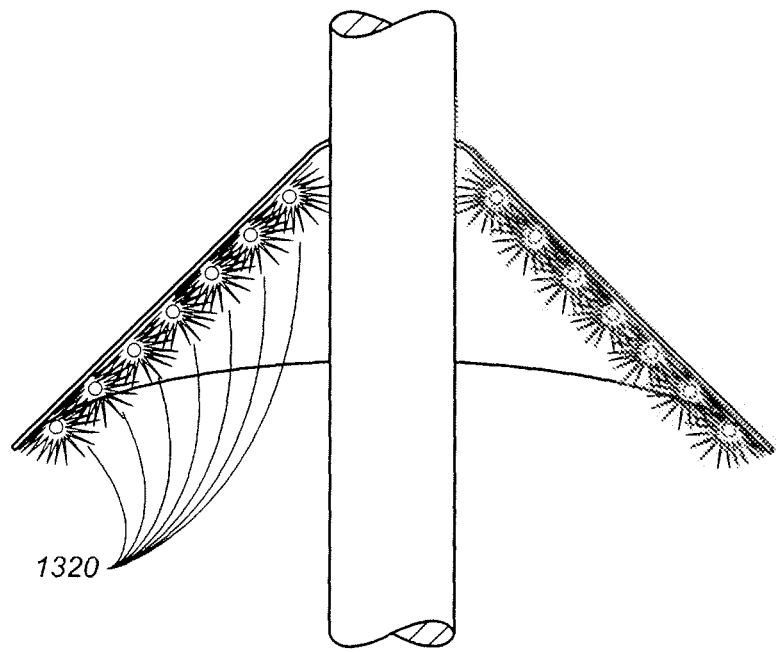

FIGS. 20-22 show additional exemplary embodiments for mounting the feather barriers. FIG. 20A shows a cone-shaped moisture barrier 1300 attached in the path of a crawling insect (e.g., a table leg) 1310. FIG. 20B shows a cross-sectional view of the cone-shaped moisture barrier, illustrating the downy-bases 1320 attached to the underside of the cone-shaped barrier. The cone-shaped barrier 1300 in this embodiment serves as both a backing to attach the downy-bases 1320 and as a protection from falling moisture. Any method for installing the downy-bases 1320 to the cone-shaped barrier 1300 may be used. Furthermore, any method for arranging the downy-bases 1320 on the cone-shaped barrier 1300 may be used. Examples for different arrangements include, but are not limited to: concentric rings of downy bases, overlapping rings of downy bases, a spiral pattern of a single base, etc. If rings are used, the downy bases may either be placed closely together, forming a "field" of feathers, or each concentric ring may be placed further from the next ring, forcing the crawling insect to cross several bases separately, before successfully crossing the barrier. If protection from moisture is not a concern, the downy-bases may also be attached to both sides of the cone-shaped barrier.

Figure 21A:
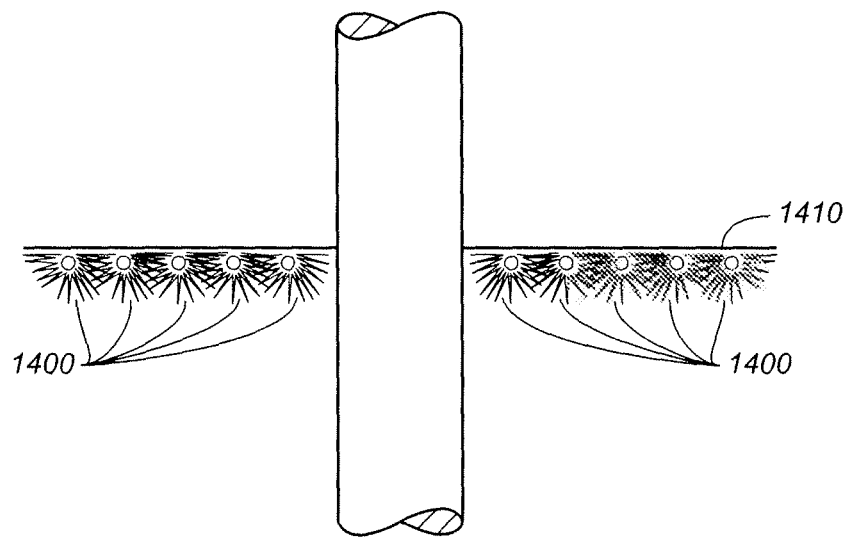
FIGS. 21A-21C illustrate an embodiment of the present invention where the downy-bases are attached to a disk-shaped backing.
Figure 21B:
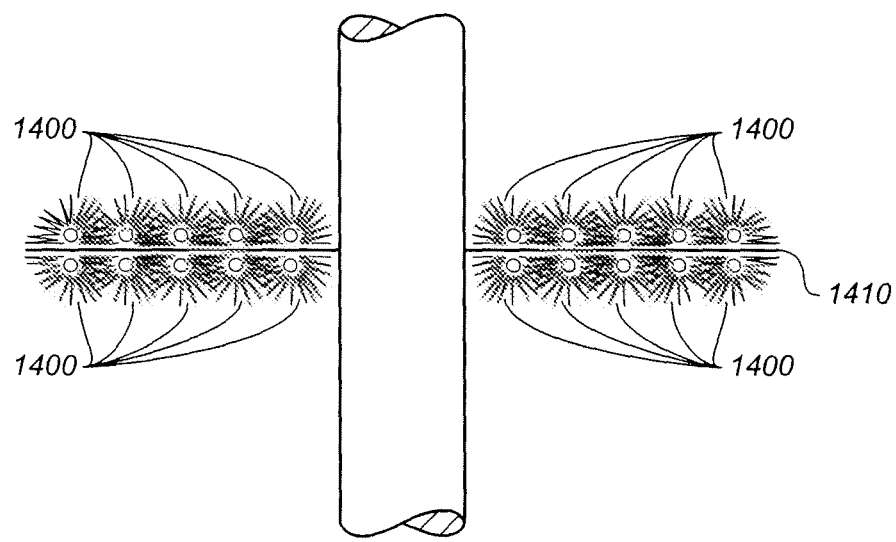
Figure 21C:
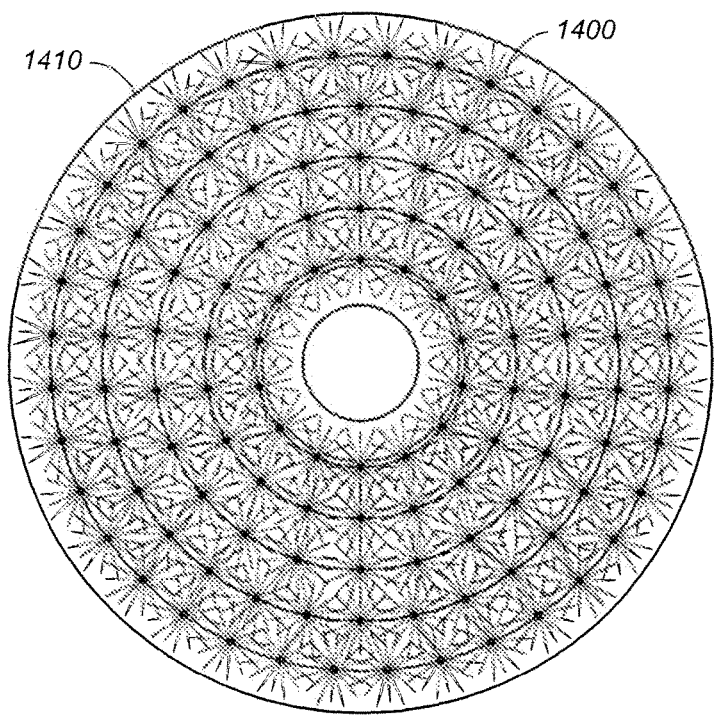

FIGS. 21A-21C illustrate an embodiment of the present invention where the downy-bases 1400 are attached to a disk-shaped backing 1410. In this embodiment, downy-bases 1400 may be installed on one, or both sides of the disk-shaped backing 1410, as illustrated in FIGS. 21A and 21B, respectively. Similar to the cone-shaped barrier, above, any method for arranging the downy-bases 1400 on the disk-shaped backing 1410 may be used. Examples for different arrangements include, but are not limited to: concentric rings of downy bases, overlapping rings of downy bases, a spiral pattern of a single base, etc. If rings are used, the downy bases may either be placed closely together, forming a "field" of feathers, (as illustrated in FIG. 21C),or each concentric ring may be placed further from the next ring, forcing the crawling insect to cross several bases separately, before successfully crossing the barrier.

Figure 22A:
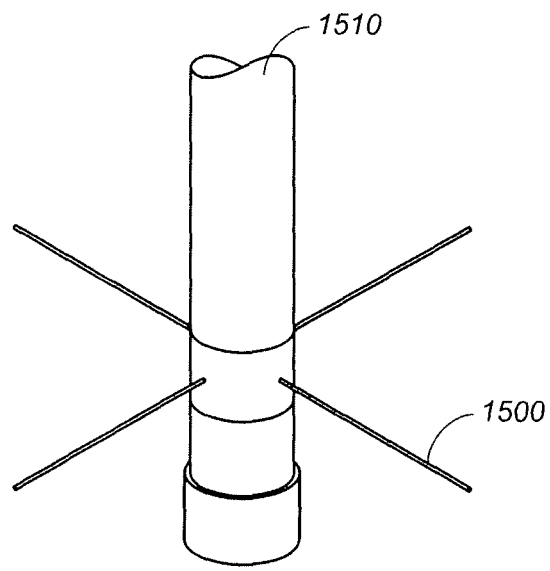
FIGS. 22A-22B show an embodiment of the present invention where the downy bases are mounted in the path of crawling insects by spokes.
Figure 22B:
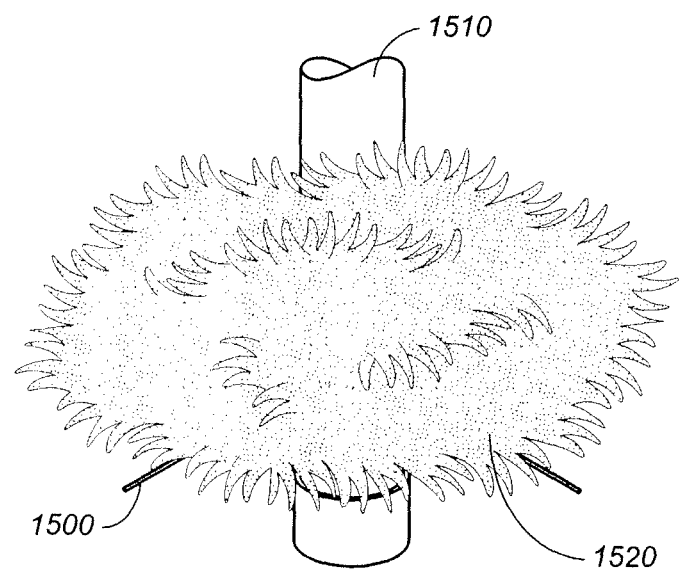

FIGS. 22A and 22B show additional exemplary embodiments for mounting the downy-bases to create a crawling insect barrier according to the present invention, where spokes 1500 are installed in the path of a crawling insect (e.g., a table leg 1510), and downy-bases 1520 are woven through the spokes, to completely surround the table leg. The spokes may be placed in any configuration in the path of a crawling insect such that downy-bases prevent a crawling insect from continuing along their path. For example, the spokes may be placed perpendicular to the path of a crawling insect and parallel to the ground, if the path is the leg of a table. Mounting the downy-bases in this manner provides a fast, convenient way to removably install the barrier. In addition, increasing the number of layers of downy-bases woven through the spokes, increases the area of downy-structures the crawling insect has to cross, which increases the effectiveness of the crawling insect barrier.

In addition to the above applications for the invention, the crawling insect barriers may also be used anywhere else that ants and other crawling insects are unwanted. For example, these barriers may be used on ships, rail cars, trucks, vans, airplanes, cars, trailers, campers, mobile homes and other vehicles.

For both the embodiment of the crawling insect barrier having an elastic string or band inside, e.g. for a table leg, and the embodiment with just a strong string, strap or the like inside, e.g., for fastening around the perimeter of a window, the feather shafts are preferably sewn onto the surface of the underlying material. A needle and thread is preferably used to fasten the feather shafts to the elastic band, strap, or string. The thread preferably binds around many shafts at the same time, and is packed around the elastic band or string.

The foregoing disclosure and description of the invention are illustrative and explanatory thereof, and various changes in the details of the illustrated embodiments and methods of use may be made without departing from the scope of the present invention.

What is claimed is:

1. A crawling insect barrier configured to be positionable along a path for blocking crawling insects from traveling along said path to a predefined area, comprising:

a base and a plurality of downy structures fastened to said base to form a downy-base, each said downy structure comprising only a natural downy feather, said base comprising a string or a rope;

wherein the number of said plurality of downy structures that are fastened to said base are configured to prevent the existence of any gaps between said downy structures and said base large enough to allow a crawling insect of a predetermined size to pass through.

2. The crawling insect barrier of claim 1, wherein each of said downy structures is a turkey marabou, a goose down, a duck down or an ostrich feather.

3. The crawling insect barrier of claim 1, wherein said base comprises an elastic material.

4. The crawling insect barrier of claim 1, wherein said downy structures are attached on all sides of said base, such that said downy structures extend in all directions from said base.

5. The crawling insect barrier of claim 1, wherein said path is a window, door, wall, entryway or roof.

6. The crawling insect barrier of claim 1, wherein said downy structures are attached to one side of said base.

7. The crawling insect barrier of claim 1, further comprising a covering positionable such that said downy structures are protected from moisture.

8. The crawling insect barrier of claim 7, wherein said covering is cone-shaped.

9. The crawling insect barrier of claim 8, wherein said downy-base is fastened to the underside of said cone-shaped covering.

10. The crawling insect barrier of claim 7, wherein said covering is in the shape of an inverted gutter.

11. The crawling insect barrier of claim 1, wherein said base has a predetermined length whose ends are connected together to form a continuous ring.

12. The crawling insect barrier of claim 11, wherein at least one of said continuous rings is placed in a path of a crawling insect.

13. The crawling insect barrier of claim 12, wherein said path is a leg, stilt, wheel base or support.

14. The crawling insect barrier of claim 13, wherein said ring is held in place by a ridge, bar, spoke, protrusion, pin, disk, groove, wire, string, elastic tension or rubber band.

15. The crawling insect barrier of claim 11, wherein said ring is held in place by glue, tape, epoxy, needle and thread, nails, screws, staples, tacks, wire or string.

16. The crawling insect barrier of claim 1, further comprising a plurality of spokes, said downy-base is interwoven through said plurality of spokes, the plurality of spokes positioned such that said downy-base crosses a path of a crawling insect and said crawling insect must traverse at least one of said downy-bases to access a predefined area.

17. The crawling insect barrier of claim 1, further comprising a substantially planar backing, said substantially planar backing positioned in a path of a crawling insect, said downy-base attached to said substantially planar backing such that said crawling insect must cross at least one of said downy-bases to access a predefined area.

18. The crawling insect barrier of claim 1, wherein said downy structures are glued onto said base.

19. The crawling insect barrier of claim 1, wherein said downy structures are sewn onto said base.

20. The crawling insect barrier of claim 19, wherein said base is glued onto a strap.

21. The crawling insect barrier of claim 1, wherein the crawling insect comprises an ant.

\* \* \* \* \*